(12) United States Patent
Shimamoto et al.

(10) Patent No.: US 6,339,567 B1
(45) Date of Patent: Jan. 15, 2002

(54) METHOD OF AND APPARATUS FOR OPTICAL INFORMATION REPRODUCTION

(75) Inventors: Masayoshi Shimamoto; Takehiko Umeyama; Yoshiji Inoue, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/233,054

(22) Filed: Jan. 19, 1999

(30) Foreign Application Priority Data

Jan. 16, 1998 (JP) .......................................... 10-006583

(51) Int. Cl.[7] .................................................. G11B 7/09
(52) U.S. Cl. ................................ 369/44.35; 369/44.41; 369/44.29
(58) Field of Search ........................... 369/44.29, 44.35, 369/44.41, 54

(56) References Cited

U.S. PATENT DOCUMENTS

| | | | |
|---|---|---|---|
| 4,057,833 A | | 11/1977 | Braat |
| 5,005,163 A | * | 4/1991 | Yamamoto et al. ...... 369/44.36 |
| 5,859,816 A | * | 1/1999 | Yamamota ............... 369/44.25 |
| 5,986,999 A | * | 11/1999 | Takahashi ................ 369/44.41 |
| 6,028,826 A | * | 2/2000 | Yamamoto etal. ....... 369/44.35 |

FOREIGN PATENT DOCUMENTS

| | | |
|---|---|---|
| CA | 2259580 | 6/1997 |
| DE | 19627383 A1 | 1/1998 |
| EP | 0238162 | 9/1998 |
| JP | 52-93222 | 5/1977 |
| JP | 02108244 | 4/1990 |
| JP | 02-108244 A | 4/1990 |

OTHER PUBLICATIONS

Technical Paper of The Institue of Electronics and Communication Engineers of Japan, OPE 96 150 pp. 33–38, Yamamoto, et al. "Development of a High–Precision Learning Control Method in a DVD–ROM Drive".

* cited by examiner

Primary Examiner—Thang V. Tran

(57) ABSTRACT

In an optical information reproduction method and apparatus with a tracking servo system using a tracking error signal in the phase difference method, the effect of the offset which varies depending on the pit depth and the lens position can be corrected and a tracking error detecting means free from the offset can be obtained. To this end, the phase comparison means are made to receive a certain set of input signals during the offset correction, and a different set of input signals during the tracking error signal detection. The offset in the tracking error signal which varies depending on the pit depth and the lens position is obtained as a voltage value, and through repeated learning control, this offset is corrected.

19 Claims, 13 Drawing Sheets

PIT DEPTH : $\lambda/4$
LENS SHIFT : NONE
FIG. 6A
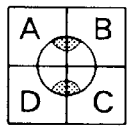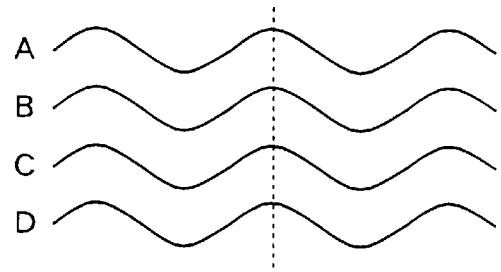
PIT DEPTH : $\lambda/4$
LENS SHIFT : PRESENT
FIG. 6B
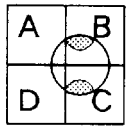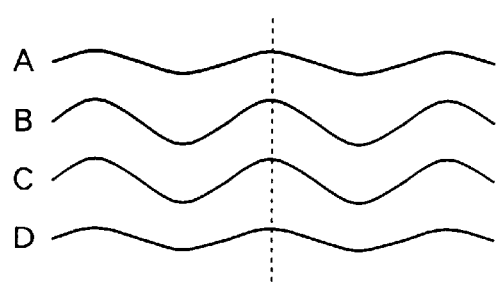
PIT DEPTH : OTHER THAN $\lambda/4$
LENS SHIFT : NONE
FIG. 6C
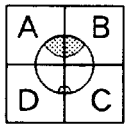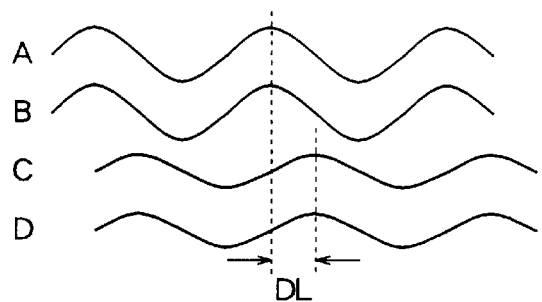
PIT DEPTH : OTHER THAN $\lambda/4$
LENS SHIFT : PRESENT
FIG. 6D
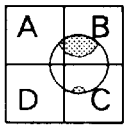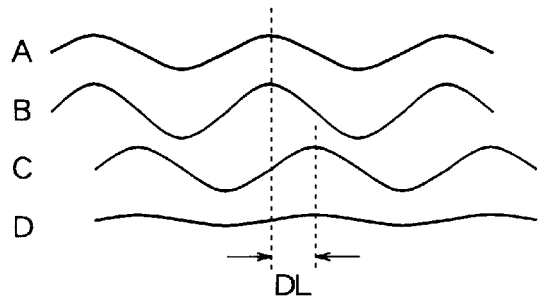

METHOD OF AND APPARATUS FOR OPTICAL INFORMATION REPRODUCTION

BACKGROUND OF THE INVENTION

The present invention relates to a method of and an apparatus for optical information reproduction in which a light spot traces an information track consisting of a sequence of pits by which information is recorded on an information recording medium, to read the recorded information. More particularly, the present invention relates to tracking control for guiding the light beam converged onto the medium, along the center of the track.

The invention also relates to an offset removing circuit used in such an optical information reproduction apparatus.

In recent years, optical disks such as DVDs which can be used for optical recording and reproduction of information are drawing attention as information medium capable of storing a large amount of video information and computer data. The optical disks are provided with concentric or spiral tracks at a pitch of about 1 $\mu$m, and the information is recorded along the track by means of variations in a local optical constant or physical shape.

In order to reproduce information from the optical disk of this form of recording with a high quality, the optical information reproducing apparatus controls the position of convergence of the light spot for reading the information, so that the light spot keeps tracing the track. The position control of the light spot is effected in two dimensions. The control in the direction of the optical axis is effected by a focus control means, while the control in the radial direction of the disk is effected by a tracking control means. These controls are effected by feedback control in which the position of the light spot is controlled so as to eliminate the error which is the difference between the target position of the light spot and the current position.

Various methods have been devised for producing the tracking error signal necessary for the tracking control by an optical means. Among these various methods is a phase difference method which uses a signal obtained from a main light spot for reproducing the information recorded on the information medium. The principle of the phase difference method is disclosed in Japanese Patent Kokal Publication No. 52-93222, and its counterpart, U.S. Pat. No. 4,057,833 to Braat.

FIG. 5A to FIG. 5E are drawings for explaining the principle of detection of the tracking error information in the phase difference method. FIG. 5A shows the relative positions of the information pits and the light spot. It shows how the light spot moves in the direction of from time t0 to t4. The running position, point ($\beta$), of the light spot is the center of the track from which information is to be reproduced. The point ($\alpha$) is on the left side of the center of the track from which information is to be reproduced. The point ($\gamma$) is on the right side of the center of the track from which information is to be reproduced.

FIG. 5B shows the photo-electric conversion means which detects the light reflected from the information medium, and converts it into electrical signals. The illustrated photoelectric conversion means is divided into first to fourth optical detectors by a division line extending in the direction corresponding to a track tangential direction, and a division line in the direction corresponding to a direction perpendicular to the track tangential direction. Ideally, the optical system is so designed that the center of the far-field pattern of the light reflected from the recording medium is formed at the center of the four optical detectors.

In other words, the first to fourth optical detectors are situated in the far-field of the information pits in separate quadrants of an imaginary X-Y coordinate system, whose origin is disposed on an optical axis of the optical system and whose X-axis effectively extends in the track tangential direction TT and whose Y-axis effectively extends transversely to the track tangential direction TT.

The first and second optical detectors are disposed on one side of the Y-axis. The third optical detector is disposed on the other side of the Y-axis, and disposed diagonally with respect to the first optical detector. The fourth optical detector is disposed on the other side of the Y-axis, and disposed diagonally with respect to the second optical detector.

The phrase "the optical detectors are situated in the far field of the information pits" is to be understood to mean that these detectors are located in a plane in which the different orders of the light beam reflected from the information medium are sufficiently distinct, i.e., in a plane which is sufficiently far from the image of the information pits.

The phrase "the X-axis effectively extends in the track tangential direction and the Y-axis effectively extends transversely to the track tangential direction," is to be understood to mean that the imaginary projections of these axes on the information pits extend in the track tangential direction, and transversely to the track tangential direction.

Further explanation is given in U.S. Pat. No. 4,057,833, which is hereby incorporated by reference.

A phase difference is present between the two detection signals (A+C) and (B+D) obtained by adding the outputs of the optical detectors disposed diagonally to each other, and the phase difference is proportional to the off-track amount, i.e., the amount by which the light spot is deviated from the center of the track. This is shown in FIG. 5C, FIG. 5D and FIG. 5E.

FIG. 5C shows how the phase relationship between the two detection signals varies with the scanning position of the light spot. The waveforms on the left are the detection signal waveforms obtained when the light spot scans a point ($\alpha$), i.e., on the left side of the center of the pit. As will be seen, the detection signal (A+C) is leading the detection signal (B+D) in phase. The waveforms in the center are the detection signal waveforms obtained when the light spot scans a point ($\beta$), i.e., the center of the pit. As will be seen, the detection signal (A+C) and the detection signal (B+D) are in phase. The waveforms on the right are the detection signal waveforms obtained when the light spot scans a point ($\gamma$), i.e., on the right side of the center of the pit. As will be seen, the detection signal (A+C) is lagging behind the detection signal (B+D) in phase.

FIG. 5D shows the phase difference between the detection signal (A+C) and the detection signal (B+D) with respect to the scanning position of the light spot. The phase difference is represented by the pulse width. The pulse on the "+" side (above 0 level) indicates that the detection signal (A+C) is leading the detection signal (B+D), while the pulse on the "−" side (below 0 level) indicates that the detection signal (A+C) is lagging behind the detection signal (B+D). When the detection signal (A+C) and the detection signal (B+D) are in phase, no pulse occurs in the "+" side and the "−" side.

FIG. 5E shows the pulse width, i.e., the phase difference with respect to the scanning position of the light spot, and how it is in proportion with the off-track amount from the track center. This phase difference is converted into electrical signals, and a tracking error signal necessary for tracking is thus obtained.

It is known that the tracking error signal is associated with an offset (hereinafter referred to as "first offset") which is dependent on the pit depth. The details is described on pp. 33–38 of Technical Paper of the Institute of Electronics and Communication Engineers of Japan, OPE 96-150, "Development of a High-Precision Learning Control Method in a DVD-ROM Drive."

FIG. 6A to FIG. 6D illustrates the principle of the offset generation. The drawing shows the waveforms of the outputs (A to D) of the four detectors obtained when the light beam is positioned at the center of the track. The pit depth and the presence or absence of the lens shift are taken as parameters.

When the pit depth is $\lambda/4$ ($\lambda$ being the wavelength of light from a laser diode (hereinafter referred to as LD)), the waveform patterns of the (A+C) signal and the (B+D) signal obtained from the optical detectors in the respective quadrants of the X-Y coordinate system explained above are identical, and even if the lens is shifted and the light spot on the optical detectors moves, the phase difference between the (A+C) signal and the (B+D) signal is zero as long as the light spot is on the center of the track.

When the pit depth is other than $\lambda/4$, a level difference is present between the (A+C) signal and the (B+D) signal. When the reflected light on the optical detectors does not move, there is no level difference between the (A+C) signal and the (B+D) signal, and the tracking error signal is zero. When the lens moves, an imbalance is generated between the (A+C) signal and the (B+D) signal. As a result, a phase difference is generated and the first offset is generated in the tracking error signal.

A conventional optical information reproducing apparatus for obtaining a tracking error signal using the phase difference method having the above-described characteristics will next be described with reference to FIG. 7. In FIG. 7, reference numeral 1 denotes an information medium, 2 denotes an optical head, 3 denotes a first phase adjusting means, 4 denotes a second phase adjusting means, 5 denotes a phase adjustment amount setting means, 6 denotes a phase difference detecting means, 7 denotes an offset correction learning means, 8 denotes a tracking control means, 9 denotes a first switch means, and 10 denotes a driver. The optical head 2 comprises an LD 21, a beam splitter (hereinafter abbreviated as BS) 22, an actuator 23, a lens 24, and a photo-electric conversion means 25. The phase difference detection means 6 comprises a first addition means 61, a second addition means 62, a first comparator 63, a second comparator 64, a phase comparison means 65, and a phase difference-to-voltage conversion means 66. The offset correction leaning means 7 comprises a waveform symmetry measuring means 71 and a controller 72.

The operation of the conventional optical information reproducing means configured as described above will next be described with reference to FIG. 7. The optical output from the LD 21 forming the optical head 2 is controlled by a laser power control means, not shown, so that the light as incident on the information medium 1 is of a predetermined power. The optical beam emitted from the LD 21 is converted to parallel light by a collimator means, not shown, and is incident on the BS 22. The BS 22 has such characteristics that the light incident from the LD 21 is passed, while the light from the information medium 1 is reflected. The light having passed the BS 22 is converged onto a center of an information track on the information medium 1, by a lens 24 controlled by the actuator 23.

The light reflected from the information medium 1 is passed through the lens 24, and is reflected at the BS 22, and is incident on the photo-electric conversion means 25. The photo-electric conversion means 25 is divided into first to fourth optical detectors 25a to 25d by a division line extending in the track tangential direction TT, and a division line extending in the radial direction, which is perpendicular to the tangential direction, detects the reflected light from the information medium, which contains information of pits formed on the information medium 1, and converts the reflected light into electrical signals.

The division is so designed that the center of the far-field pattern is formed at the center of the photo-electric conversion means 25 in an ideal state in which the light spot is tracing the center of the track having pits with a depth of $\lambda/4$. The positional relationship between the first to fourth optical detectors 25a to 25d is such that the first and second optical detectors 25a and 25b are disposed on one side of the division line extending in the perpendicular direction, and the third and fourth optical detectors 25c and 25d are on the other side of the division line extending in the perpendicular direction. The first and third optical detectors 25a and 25c are disposed at diagonal positions, and the second and fourth optical detectors 25b and 25d are disposed at the other diagonal positions.

In other words, the first to fourth optical detectors 25a–25d are situated in the far-field of the information pits in separate quadrants of an imaginary X-Y coordinate system, whose origin is disposed on an optical axis of the optical system (comprising the BS 22 and the lens 24) and whose X-axis effectively extends in the track tangential direction TT and whose Y-axis effectively extends transversely to the track tangential direction TT.

The first and second optical detectors 25a and 25b are disposed on one side of the Y-axis. The third optical detector 25c is disposed on the other side of the Y-axis, and disposed diagonally with respect to the first optical detector 25a. The fourth optical detector 25d is disposed on the other side of the Y-axis, and disposed diagonally with respect to the second optical detector 25b.

The optical system is so designed that a phase difference proportional to the offset amount is present between the two detection signals (A+C) and (B+D) obtained by adding the diagonal components of the outputs A, B, C and D of the first to fourth optical detectors.

When the pit depth is other than $\lambda/4$, a phase difference is generated between the (A+C) signal and the (B+D) signal due to imbalance, and this forms a first offset in the tracking error signal. In order to cancel the first offset, the conventional optical information reproducing apparatus adjusts the phase of the output A of the first optical detector and the output B of the second optical detector, by means of the first phase adjustment means 3 and the second phase adjustment means 4, so as to adjust the phase relationship with respect to the output C of the third optical detector and the output D of the fourth optical detector.

The optimum value of the phase adjustment amount depends on the depth of the pit. The phase adjustment amounts set by the first phase adjustment means 3 and the second phase adjustment means 4 are controlled to such values that the offset correction learning means 7 and the phase adjustment amount setting means 5 yield the best tracking error signal.

The phase difference detection means 6 detects the tracking error signal from the output A' of the first phase adjustment means 3, the output B' of the second phase adjustment means 4, the output C of the third optical detector, and the output D of the fourth optical detector D, and through the following process.

The output A' of the first phase adjusting means 3 and the output C of the third optical detector disposed at a diagonal position of the first optical detector are added at the first adding means 61 which is a component of the phase difference detecting means 6, and then binarized at the first comparator 63. The output B' of the second phase adjusting means 4 and the output D of the fourth optical detector disposed at a diagonal position of the second optical detector are added at the second adding means 62, and then binarized at the second comparator 64.

The phase difference between the two binary signals from the first comparator 63 and the second comparator 64 is detected at the phase comparison means 65, and is converted at the phase difference-to-voltage conversion means 66, to produce the phase difference tracking error signal. In the prior art, a low-pass filter (hereinafter referred to as LPF) is used as the phase difference-to-voltage conversion means.

The tracking error signal thus detected is input to the offset correction learning means 7 and the tracking control means 8. The offset correction learning means 7 measures the symmetry of the tracking error signal, by means of the waveform symmetry measuring means 71. The controller 72 controls the phase adjustment amounts of the first phase adjustment means 3 and the second adjustment amount means 4, via the phase adjustment amount setting means 5, so as to maximize the symmetry. The offset correction learning algorithm followed is shown in FIG. 8.

When the operation in the offset correction learning mode is started (S1), the controller 72 controls the switching means 9 so that the output of the controller 72 is input to the driver 10. The tracking control is thereby disabled, and the lens 24 is driven radially inward under control by the controller 72 (S2). In this state, the controller 72 controls, via the phase adjustment amount setting means 5, the first phase adjusting means 3 and the second phase adjusting means 4, and determines the phase adjustment amount which maximizes the symmetry of the tracking error signal (S3).

Next, the controller 72 drives the lens 24 radially outward (S4). In this state, the controller 72 controls, via the phase adjustment amount setting means 5, the first phase adjusting means 3, and the second phase adjusting means 4, and determines the phase adjustment amount which maximizes the symmetry of the tracking error signal (S5).

Lastly, the controller 72 determines the phase adjustment amount which minimizes the difference between the symmetries of the tracking error signals, based on the best phase adjustment amounts on the radially inner and radially outer sides determined at the steps S3 and S5, and sets the value in the first phase adjusting means 3 and the second phase adjusting means 4 (S6).

When the operation in the offset correction learning mode is completed, the controller 72 then switches the first switch 9 so that the output of the tracking control means 8 is input to the driver 10. The tracking control means 8 controls, via the drier 10 and the actuator 23, the lens 24 in the radial direction, so as to eliminate the tracking error detected by the phase difference detecting means 6, and that the light beam emitted from the light head on the information medium traces the center of the track.

The conventional optical information reproducing apparatus uses the symmetry of the waveform of the tracking error signal, i.e., the amount of shift of the center level of the reproduced waveform from the reference level, as information for identifying the best phase adjustment amount by means of the phase adjusting means. To measure the symmetry of the reproduced waveform, it is necessary to determine the local maximum and local minimum of the tracking error signal. As a means for determining the local maximum and local minimum, a measuring means which digitally process the signal obtained by discretely sampling the signal level by means of an analog-to-digital converting circuit (hereinafter referred to as ADC), and a measuring means which detects, in an analog manner, the envelope of the peak and the envelope of the bottom of the tracking error signal, and determines the median point thereof. In the case of the measuring means using the ADC, points which are not at the local maximum and local minimum (which are instantaneous values), but which are near them may be sampled, depending on the sampling rate. In such a situation, measuring errors are contained in the median point between the local maximum and the local minimum measured, and the quality of the tracking error signal will be deteriorated. If it is attempted to reduce the measuring errors by the use of a high-speed ADC, the cost of the apparatus may be increased. If it is attempted to reduce the measurement errors by the use of analog means, two series of envelope measurement circuits are required, increasing the size of the circuit.

In addition, the conventional optical information reproducing apparatus cannot cancel the electrical offset occurring in the circuits after the phase comparison circuit. This means that whether the offset in the tracking error signal is due to the electrical offset or the first offset caused by the improper setting of the phase adjusting means is not known, and the offset correction learning may decrease the quality of the tracking error signal, rather than increasing it.

Moreover, the conventional optical information reproducing apparatus cannot adjust the amplitude of the tracking error signal to a predetermined value, so that it cannot correct the variation in the overall gain in the tracking control system due to the variations in the characteristics of the optical head, the information recording medium, and the circuits, and the control performance may therefore be lowered.

SUMMARY OF THE INVENTION

The invention has been made to solve the problems described above, and its first object is to provide an optical information reproducing method and apparatus in which by just changing the combination of the input signals to the phase comparison means of the tracking error signal detecting circuit by means of the phase difference method, the phase adjustment amounts adjusted by the phase adjusting means for the respective output signals of the optical detectors can be set to the best values, without affecting the cost of the apparatus, and without decreasing the quality of the tracking error signal.

A second object of the invention is to provide an optical information reproducing method and apparatus which can cancel the electrical offset.

A third object of the invention is to provide a means for setting the amplitude of the reproduced tracking error signal to a predetermined level.

According to one aspect of the invention, there is provided an optical information reproducing apparatus for reading recorded information by having a light spot trace an information track consisting of a sequence of information pits by which information is recorded on an information medium, comprising:

a light source emitting a light beam;

photo-electric conversion means including first to fourth optical detectors;

an optical system for passing the light beam from the light source to the photo-electric conversion means via the information medium;

the first to fourth optical detectors converting the light beam into electrical signals, the first to fourth optical detectors being situated in the far-field of the information pits in separate quadrants of an imaginary X-Y coordinate system, whose origin is disposed on an optical axis of the optical system and whose X-axis effectively extends in the track tangential direction and whose Y-axis effectively extends transversely to the track tangential direction, the first and second optical detectors being disposed on one side of the first and second optical detectors being disposed on one side of the Y-axis, the third optical detector being disposed on the other side of the Y-axis, and disposed diagonally with respect to the first optical detector, and the fourth optical detector being disposed on the other side of the Y-axis, and disposed diagonally with respect to the second optical detector;

first to fourth phase adjusting means for individually adjusting the phase of each of the outputs from the first to fourth optical detectors;

phase difference detecting means for detecting the phase difference between the first sum signal obtained by adding the output of the first phase adjusting means and the output of the second phase adjusting means, and the second sum signal obtained by adding the output of the third phase adjusting means and the output of the fourth phase adjusting means, or the phase difference between the third sum signal obtained by adding the output of the first phase adjusting means and the output of the third phase adjusting means, and the fourth sum signal obtained by adding the output of the second phase adjusting means and the output of the fourth phase adjusting means;

offset correction learning means for adjusting the first to fourth phase adjusting means in accordance with the output of the phase difference between the first and the second sum signals from the phase difference detecting means, so as to eliminate the phase difference; and tracking control means for obtaining the tracking error signal information from the output of the phase difference between the third and fourth sum signals from the phase difference detecting means.

The phase difference detecting means may comprise a switch means for switching between the phase difference between the first and second sum signals, or the phase difference between the third and fourth sum signals, in accordance with the output from the offset correction learning means.

The offset correction learning means may comprise:

offset adjusting means for adjusting the electrical offset superimposed with the output of the phase difference detecting means;

offset measuring means for measuring the output from the offset adjusting means, to determine the electrical offset;

reproduction level measuring means for measuring the output amplitude of the offset adjusting means; and control means responsive to the output from the offset measuring means and the output from the reproduction level measuring means, for controlling the phase difference detecting means, the offset adjusting means, and the phase adjusting means.

The phase difference detecting means may be configured to detect, by a phase comparison means, the phase difference between the signals, and convert, by a low pass filter, the phase difference into a voltage, with the gain for conversion to the voltage being varied by variation of the gain of the low-pass filter.

The phase difference detecting means may be configured to detect, by phase comparison means, the phase difference between the two signals, and convert, by a charge pump and a low-pass filter, the phase difference into a voltage, with the gain for conversion to the voltage being varied by variation of the drive current to the charge pump or the gain of the low-pass filter.

According to another aspect of the invention, there is provided an optical information reproducing method for reading recorded information by having a light spot trace an information track consisting of a sequence of information pits by which information is recorded on an information medium, the method being implemented by the use of an optical information reproducing apparatus for reading recorded information by having a light spot trace an information track consisting of a sequence of information pits by which information is recorded on an information medium, comprising:

light source emitting a light beam;

photo-electric conversion means including first to fourth optical detectors;

an optical system for passing the light beam from the light source to the photo-electric conversion means via the information medium;

the first to fourth optical detectors converting the light beam into electrical signals, the first to fourth optical detectors being situated in the far-field of the information pits in separate quadrants of an imaginary X-Y coordinate system, whose origin is disposed on an optical axis of the optical system and whose X-axis effectively extends in the track tangential direction and whose Y-axis effectively extends transversely to the track tangential direction.

the first and second optical detectors being disposed on one side of the Y-axis, the third optical detector being disposed on the other side of the Y-axis, and disposed diagonally with respect to the first optical detector, and the fourth optical detector being disposed on the other side of the Y-axis, and disposed diagonally with respect to the second optical detector;

the method comprising steps of:

(a) conducting initial setting when the operation in an offset correction learning mode is started;

(b) selecting a first phase comparison mode in which a phase difference between a first sum signal obtained by adding a first phase adjustment output and a second phase adjustment output, and a second sum signal obtained by adding a third phase adjustment output and a fourth phase adjustment output, said first to fourth phase adjustment outputs being obtained by individually adjusting the phase of the output of each of the first to fourth optical detectors;

(c) driving the lens in a first one of the radially inward and radially downward directions of the information medium;

(d) detecting the phase difference in the operation in the first phase comparison mode, in a state in which the lens has been driven to the first one of the radially inward and radially outward directions of the information medium;

(e) individually adjusting the phase of the output of each of the first to fourth optical detectors so as to eliminate the phase difference detected at step (d);

(f) driving the lens in a second one of the radially inward and radially outward directions of the information medium;

(g) detecting the phase difference in the operation in the first phase comparison mode, in a state in which the lens has been driven to the second one of the radially inward and radially outward directions of the information medium;

(h) individually adjusting the phase of the output of each of the first to fourth optical detectors so as to eliminate the phase difference detected at the step (g); and (i) adjusting the adjustment amount at the step (e), and the step (h).

The method may further comprise the steps of:

selecting a second phase comparison mode for detecting the phase difference between a third sum signal obtained by adding the first phase adjustment output and the third phase adjustment output, and a fourth sum signal obtained by adding the second phase adjustment output and the fourth phase adjustment output;

making an adjustment so that the reproduction level of the phase difference output detected in the second phase comparison mode is within a permissible range; and making an adjustment so that the electrical offset superimposed on the phase difference output is within a permissible range.

The method may further comprise the steps of:

selecting the second phase comparison mode for detecting the phase difference between a third sum signal obtained by adding the first phase adjustment output and the third phase adjustment output, and a fourth sum signal obtained by adding the second phase adjustment output and the fourth phase adjustment output;

the step of selecting the second phase comparison mode being conducted after the step (e) and the step (g); and adjusting the amplitude of the tracking error signal.

By setting the phase adjustment amounts of the first to fourth phase adjusting means so that the phase difference between the first sum signal and the second sum signal is eliminated, deterioration of the tracking error signal generating depending on the pit depth and the lens position is reduced, and the tracking error signal is obtained from the phase difference between the third sum signal and the fourth sum signal.

By switching the signals which are compared at the phase comparison means, the tracking error signal or the first offset which varies depending on the pit depth and the lens position, problematical in obtaining the tracking error signal in the phase difference method, can be detected directly.

By adding the function for correcting the gain variations in the tracking control system due to variations (due for example to manufacturing tolerances) in the characteristics of the circuits, the optical heads, or the like, and the electrical offset due to the circuits, causing deterioration of the tracking error signal, a tracking error signal with a high quality can be obtained.

According to the method described above, in order to unequivocally determine the phase adjustment amounts of the first to fourth adjusting means, while reducing the effects of the lens position, the lens is moved radially inward and radially outward, and the phase difference adjustment amounts for minimizing the phase difference between the first and second sums are determined.

Moreover, the electrical offset superimposed with the tracking error signal is canceled, and the amplitude variation of the tracking error signal due to variations (due for example to manufacturing tolerances) of the characteristics of the respective blocks used for implementing the invented method, and the reliability of the tracking control system is improved.

After canceling the first offset superimposed with the tracking error signal due to the pit depth and the lens position, the phase difference between the third and fourth sum signals is detected, and is converted into a voltage signal. In this way, the tracking error signal is obtained.

According to a further aspect of the invention, there is provided an offset removing circuit for an optical information reproducing apparatus for reading recorded information by having a light spot trace an information track consisting of a sequence of information pits by which information is recorded on an information medium, comprising:

a light source emitting a light beam;

photo-electric conversion means including first to fourth optical detectors;

an optical system for passing the light beam from the light source to the photo-electric conversion means via the information medium;

the first to fourth optical detectors converting the light beam into electrical signals, the first to fourth optical detectors being situated in the far-field of the information pits in separate quadrants of an imaginary X-Y coordinate system, whose origin is disposed on the optical axis of the optical system and whose X-axis effectively extends in the track direction and whose Y-axis effectively extends transversely to the track direction, the first and second optical detectors being disposed on one side of the Y-axis, the third optical detector being disposed on the other side of the Y-axis, and disposed diagonally with respect to the first optical detector, and the fourth optical detector being disposed on the other side of the Y-axis, and disposed diagonally with respect to the second optical detector;

the offset removing circuit comprising:

first to fourth phase adjusting means for individually adjusting the phase of the output of each of the first to fourth optical detectors;

phase difference detecting means for detecting the phase difference between the first sum signal obtained by adding the output of the first phase adjusting means and the output of the second phase adjusting means, and the second sum signal obtained by adding the output of the third phase adjusting means and the output of the fourth phase adjusting means, or the phase difference between the third sum signal obtained by adding the output of the first phase adjusting means and the output of the third phase adjusting means, and the fourth sum signal obtained by adding the output of the second phase adjusting means and the output of the fourth phase adjusting means; and phase adjustment amount setting means for setting the phase adjustment amount of the first to fourth phase adjusting means so that the phase difference between the first sum signal and the second sum signal is made zero.

The offset removing circuit may further comprise an offset adjusting means for adjusting the electrical offset amount of an electrical circuit forming the optical information reproducing apparatus when the operation of the phase difference detecting means is halted.

BRIEF DESCRIPTION OF THE DRAWINGS

In the accompanying drawings:

FIG. 6A to FIG. 6D are diagrams showing the principle of generation of the offset in the tracking error signal dependent on the pit depth;

DETAILED DESCRIPTION OF THE PREFERRED EMBODIMENTS

The invention will be described more specifically with reference to drawings showing its embodiments.
Embodiment 1

Figure 1:
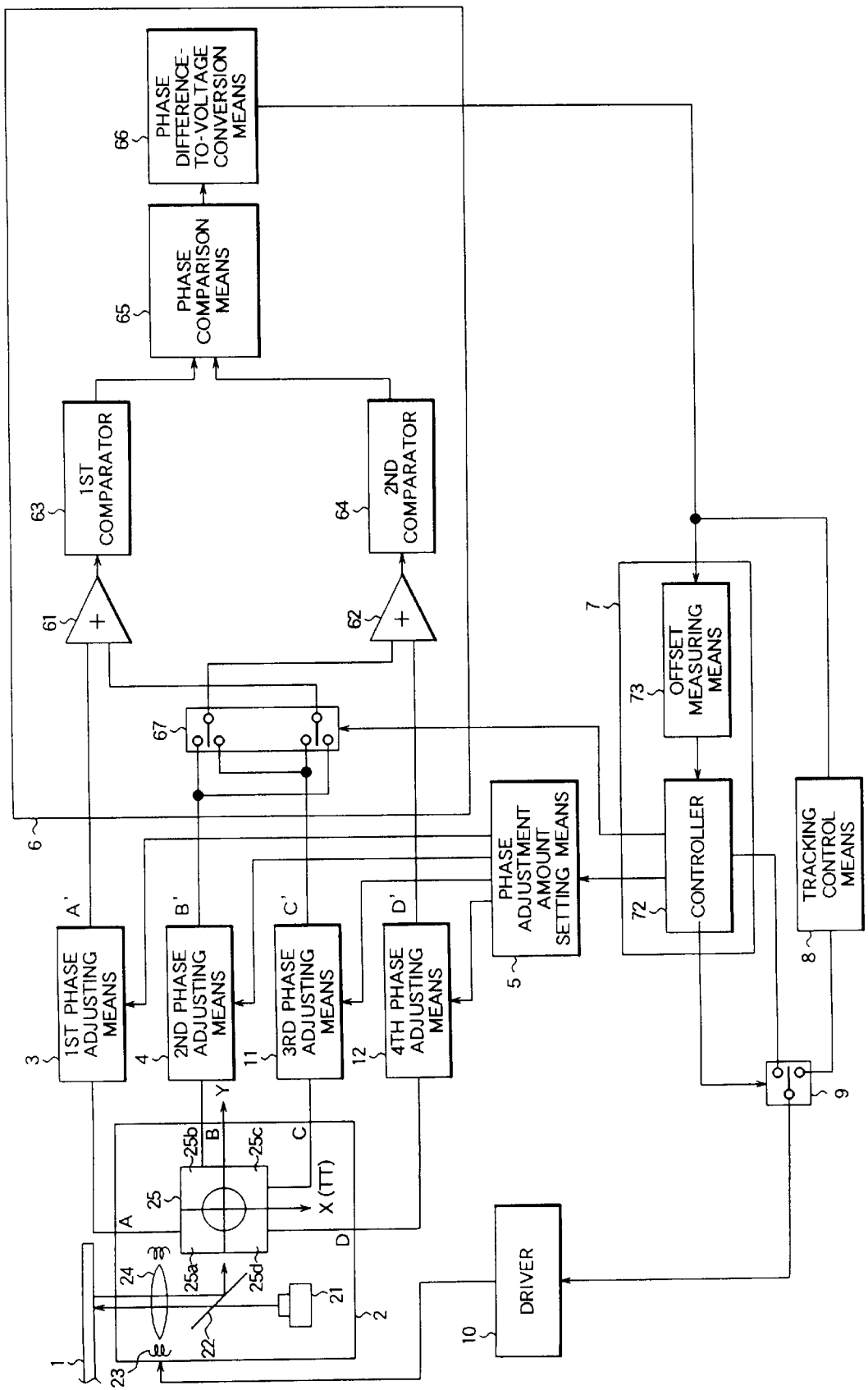
FIG. 1 is a block diagram of an optical information reproduction apparatus of Embodiment 1 of this invention.

FIG. 1 is a block diagram showing an optical information reproducing apparatus of Embodiment 1 of this invention. In FIG. 1 reference numeral 1 denotes an information medium, 2 denotes an optical head, 3 denotes first phase adjusting means, 4 denotes second phase adjusting means, 5 denotes a phase adjustment amount setting means, 6 denotes a phase difference detecting means, 7 denotes an phase difference detecting means, 8 denotes a tracking control means, 9 denotes a first switch means, 10 denotes a driver, 11 denotes a third phase adjusting means, and 12 denotes a second phase adjusting means. The optical head 2 comprises an LD 21, a BS 22, an actuator 23, a lens 24, and an photo-electric conversion means 25. The phase difference detecting means 6 comprises a first adding means 61, a second adding means 62, a first comparator 63, a second comparator 64, a phase comparison means 65, a phase difference-to-voltage conversion means 66, and a second switch means 67. The offset correction learning means 7 comprises a controller 72, and an offset measuring means 73.

The operation of the optical information reproducing apparatus of Embodiment 1 will next be described with reference to FIG. 1. The optical output from the LD 21 forming the optical head 2 is controlled by a laser power control means, not shown, so as to be at a predetermined power on the information medium 1. The light beam emitted from the LD 21 is converted into a parallel beam by a collimator means, not shown, forming the optical head 22, and is then incident on the BS 22. The BS 22 permits the light from the side of the LD 21 to pass, while it reflects the light from the side of the information medium 1. The light beam having passed the BS 22 is converged onto a center of an information track on the information medium 1.

The light reflected at the information medium 1 is passed through the lens 24 again, and is reflected at the BS 22, and is incident on the photoelectric conversion means 25. The photoelectric conversion means 25 is divided into first to fourth optical detectors 25a–25d, and the optical signals of the respective regions divided into four, in the track tangential direction TT and the radial direction, which is perpendicular to the tangential direction, are detected by far-field pattern of the light reflected from the information medium, containing information of pits formed on the information medium 1, and converted into electrical signals.

The division is designed so that, in an ideal state in which the light spot traces a center of a track having pits formed with a depth of λ/4, the center of the far-field pattern of the light reflected from the information medium 1 is formed at the center of the photoelectric conversion means 25. The positional relationship of the first to fourth optical detectors 25a–25d are such that the first and second optical detectors 25a and 25b are on one side of the perpendicular divisional line, and the third and fourth optical detectors 25c and 25d are disposed on the other side. Moreover, the first and third optical detectors 25a and 25c are disposed at diagonal positions, and the second and fourth optical detectors are disposed at diagonal positions 25b and 25d.

In other words, the first to fourth optical detectors 25a and 25d are situated in the far-field of the information pits in separate quadrants of an imaginary X-Y coordinate system, whose origin is disposed on an optical axis of the optical system comprising the BS 22 and the lens 24 and whose X-axis effectively extends in the track tangential direction TT and whose Y-axis effectively extends transversely to the track tangential direction TT.

The first and second optical detectors 25a and 25b are disposed on one side of the Y-axis. The third optical detector 25c is disposed on the other side of the Y-axis, and disposed diagonally with respect to the first optical detector 25a. The fourth optical detector 25d is disposed on the other side of the Y-axis, and disposed diagonally with respect to the second optical detector 25b.

The optical system is so designed that a phase difference is present between the two detection signals (A+C) and (B+D) obtained by adding the outputs of the optical detectors disposed diagonally to each other.

When the pit depth is different from λ/4, a level difference is present between the (A+C) signal and the (B+D) signal, and an imbalance is generated between the (A+C) signal and the (B+D) signal by the movement of the lens, and these cause a first offset of the tracking error signal, with the result that the tracking control performance is lowered. In order to eliminate the imbalance between the (A+C) signal and the (B+D) signal, the first phase adjusting means 3, the second phase adjusting means 4, the third phase adjusting means 11, and the fourth phase adjusting means 12 adjust the phase relationship between the output A of the first optical detector, the output B of the second optical detector, the output C of the third optical detector, and the output D of the fourth optical detector.

The optimum value of the phase adjustment amount is dependent on the depth of the pit, and is varied with the reproduction speed. The phase adjustment amount of each phase adjustment means is set to a value to yield the best tracking error signal, by the offset correction learning means 7 and phase adjustment amount setting means 5. In this embodiment, this is accomplished by determining the phase adjustment amount which makes the phase difference between the (A+B) signal and the (C+D) signal zero. The operation for optimizing the phase adjustment amount of each phase adjusting means will next be described.

The controller 72 controls the second switch means 67 so as to select the input signal to the first adding means 61 and the second adding means 62. By this selection, the output B' of the second phase adjusting means 4 is input to one input of the first addition means 61 and the output C' of the third phase adjusting means 11 is input to one input of the second addition means 62. Connected to the other input of the first addition means 61 is the output A' of the first phase adjusting means 3, with the result that the first addition means 61 outputs (A'+B'). Connected to the other input of the second addition means 62 is the output D' of the second phase adjusting means 12, with the result that the second addition means 62 outputs (C'+D').

The first comparator 63 binarizes the output (A'+B') of the first addition means 61, while the second comparator 64 binarizes the output (C'+D') of the second addition means 62. The phase comparison means 65 detects the phase difference between the output of the first comparator 63 and the output of the second comparator 64. The output of the phase comparison means is time information, which is converted at a phase difference-to-voltage conversion means 66 into a voltage signal. The operation described so far will be referred to as the operation in mode 1.

The output of the phase difference-to-voltage conversion means 66 provides information for optimizing the phase adjustment amount of each phase adjusting means. That is, when the phase adjustment amounts are set to optimum values, the output of the phase difference-to-voltage conversion means 66 is zero regardless of the position of the lens. In contrast, when the phase adjustment amounts are not optimum, the output of the phase difference-to-voltage conversion means 66 contains a first offset dependent on the lens position.

The optimum phase adjustment amount of each phase adjusting means is determined by monitoring the output of the phase difference-to-voltage conversion means 66 by means of the offset measuring means 73 forming the offset correction learning means 7, and having the controller 72 conduct learning-control over the phase adjustment amount of each phase adjusting means, via the phase adjustment amount setting means 5 so that the output of the phase difference-to-voltage conversion means 66 is zero regardless of the lens position.

Figure 2A:
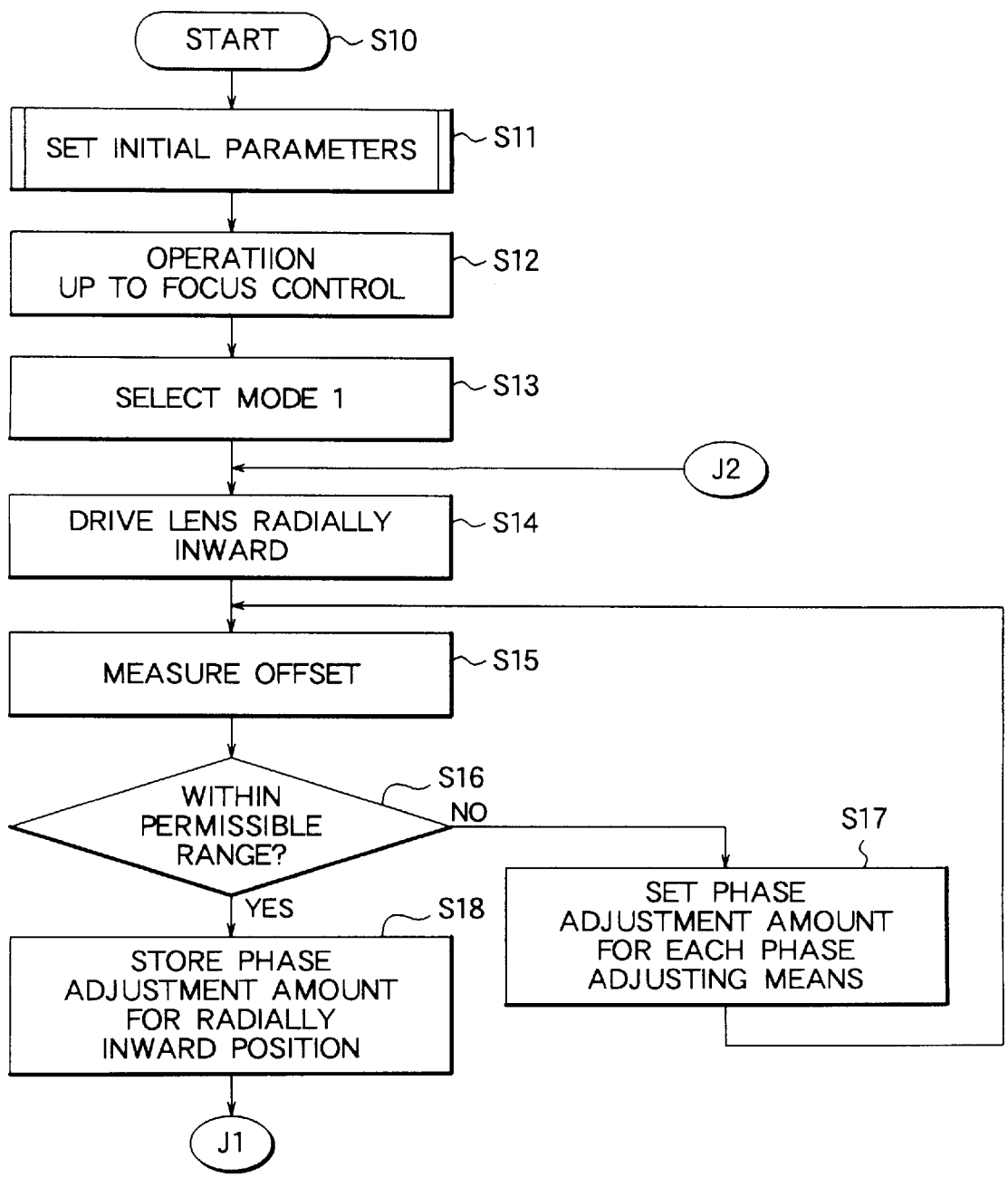
FIG. 2A and FIG. 2B are flow charts showing the offset correction learning algorithm of the offset correction learning means of the optical information reproduction apparatus of Embodiment 1.
Figure 2B:
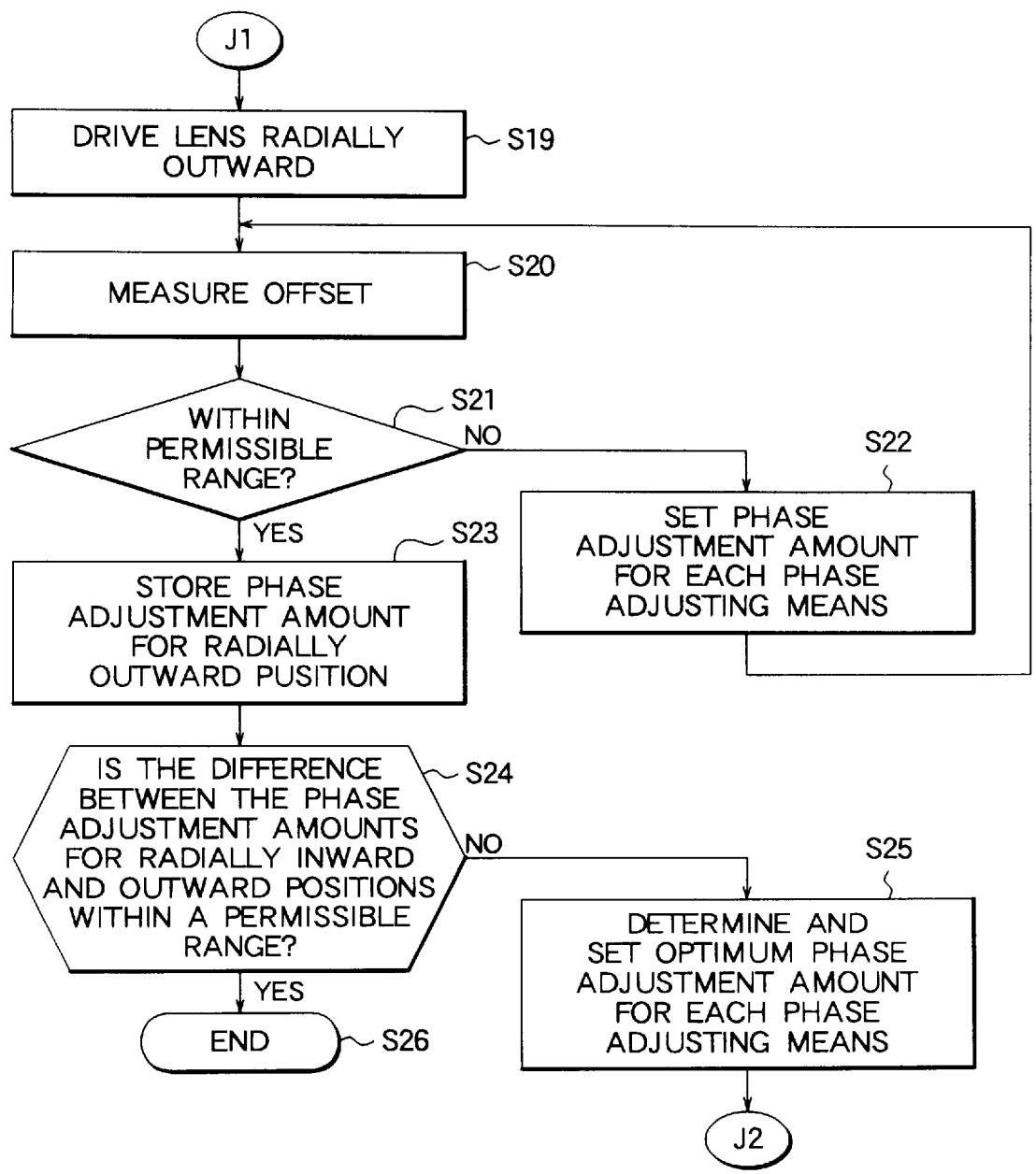

The control over the lens position is accomplished by having the controller 72 control the first switch means 9, so that the driver 10 of the actuator 23 controlling the radial position of the lens 24 is driven by the output of the controller 72. The offset correction learning algorithm follows the procedure shown in FIG. 2A and FIG. 2B. When the operation in the offset correction learning mode is started (S10), a system controller, not shown, controlling the entire apparatus, sets initial parameters in the apparatus (S11), turns on the LD, and subsequently starts operation of the optical system including the focus control for converging the light spot onto the information medium (S12). Then, the controller 72 selects the mode 1, and controls the first switch means 9 so that the output of the controller 72 is input to the driver 10, and controls the second switch means 67 so that the output B' of the second phase adjusting means 4 is input to the first adding means 61, and the output C' of the third phase adjusting means 11 is input to the second addition means 62 (S13).

Subsequently, the lens 24 is driven radially inward under control by the controller 72 (S14). In this state, the level of the output of the phase difference-to-voltage conversion means 66 is detected by the offset measuring means 73 (S15), and whether or not the result is within a permissible range is judged at the controller 72 (S16).

If the result of the judgment is "NO," the controller 72 varies, via the phase adjustment amount setting means 5, the phase adjustment amount of each phase adjusting means individually (S17), and returns to the step (S15) for detecting the level of the output of the phase difference-to-voltage conversion means 66 again. By repeating the loop formed of S15, S16, S17 and S15 until the result of the judgment becomes "YES" the optimum phase adjustment amount for each phase adjusting means when the lens is at the radially inner side is determined, and the value is stored (S18).

The controller 72 then moves the lens 24 radially outward (S19). In this state, the level of the output of the phase difference-to-voltage conversion means 66 is detected by the offset measuring means 73 (S20), and whether or not the result is within a permissible range is judged by the controller (S21).

If the result of the judgment is "NO," the controller 72 varies, via the phase adjustment amount setting means 5, the phase adjustment amount of each phase adjusting means individually (S22), and returns to the step (S20) for detecting the level of the output of the phase difference-to-voltage conversion means 66 again. By repeating the loop formed of S20, S21, S22 and S20 until the result of the judgment becomes "YES" the optimum phase adjustment amount for each phase adjusting means when the lens is at the radially outer side is determined, and the value is stored (S23).

The difference between the optimum phase adjustment amount for the radially inner side, and the optimum phase adjustment amount for the radially outer side stored for each phase adjusting means is determined, and whether or not this difference is within a permissible range is judged (S24). If the result of the judgment is "NO," then the controller 72 determines the average value or the like of the optimum phase adjustment amount for the radially inner side, and the optimum phase adjustment amount for the radially outer side stored for each phase adjusting means, and sets, via the phase adjustment amount setting means 5, this value in each phase adjusting means (S25). After this setting, the controller 72 returns to S14, and the operation of S14 through S25 is repeated until the difference between the optimum phase adjustment amount for the radially inner side, and the optimum phase adjustment amount for the radially outer side becomes within the permissible range. When the difference becomes within the permissible range, the operation in offset correction learning mode is terminated (S26).

After the phase adjustment amount of each phase adjusting means is optimized in the manner described, the operation for detecting the tracking error signal is started. The controller 72 controls the second switch means 67 so as to exchange the input signals to the first addition means 61 and the second addition means 62, so that the output C' of the third phase adjusting means 11 is input to the one input of the first addition means 61, and the output B' of the second phase adjusting means 4 is input to the one input of the second addition means 62. As a result, the first addition means 61 outputs (A'+C'), while the second addition means 62 outputs (B'+D').

The first comparator 63 binarizes the output (A'+C') of the first addition means 61, while the second comparator 64 binarizes the output (B'+D') of the second addition means 62. The phase comparison means 65 detects the phase difference between the output of the first comparator 63 and the output of the second comparator 64. The output of the phase comparison means is time information, which is converted at a phase difference-to-voltage conversion means 66 into a voltage signal. In this way, a tracking error signal in the phase difference method is obtained.

This tracking error signal represents the difference between the target position of the light spot and the current position, i.e., the error amount (off-track amount), and the tracking control means 8 controls the position of the light spot to eliminate this error amount. The control over the light spot position is accomplished by control over the radial position of the lens 24 by means of the driver 10 which drives the actuator 23 in accordance with the output of the tracking control means 8. To this end, the controller 72 causes the output of the tracking control means 8 to be supplied via the first switch means 9 to the driver 10.

In FIG. 1, the second switching means 67 is disposed between the second and third phase adjusting means and the first and second addition means, but this should not be taken as a limitation. What is required is that the phase difference between (A'+B') and (C'+D'), or (A'+C') and B'+D') be determined at the phase comparison means 65. Accordingly, similar results can be obtained even if the configuration of the outputs of the phase adjusting means to the phase comparison means 65 is modified as follows. A first modification is a configuration in which four addition means are provided to determine the four sums, two of which that are required in the selected mode are selected and input to the first and second comparators. A second modification is a configuration having four addition means and four comparators provided to produce the binary signals corresponding to the four sum signals wherein two of the binary signals are selected and input to the phase comparison means 65.

The phase difference-to-voltage conversion means 66 may be of any configuration as long as it can converts the time information, which is a phase difference, to a voltage signal. In general it is possible to configure it with a low-pass filter (hereinafter abbreviated as LPF) smoothing the input. As another configuration, a combination of a charge pump and an LPF has come to be used in practice.

The offset correction learning means 7, the tracking control means 8 and the first switch means 9 may be implemented by a digital signal processor (hereinafter referred to as DSP) with an ADC and a digital-to-analog converting circuit (hereinafter abbreviated as DAC) built therein.

In an optical information reproducing method and apparatus configured as described above, the signals which are compared at the phase comparison means 65 are switched, so that the first offset which varies depending on the pit depth and the lens position, which were problematical in obtaining the tracking error signal in the phase difference method, or the tracking error signal can be detected directly, and the phase adjustment amount of each phase adjusting means can be optimized through repeated learning control using this information. Accordingly, a system for detecting a tracking error signal, free from offset can be realized, and the reliability of the apparatus can be improved. Moreover, rather than determining the first offset on the basis of the symmetry of the waveform of the tracking error signal as in the prior art, the first offset itself is determined as a voltage value. Accordingly, the ADC for the measurement need not be of a high-speed type which is expensive, and yet the detection accuracy is not impaired. In addition, the increase of hardware is of a minimum degree, so that increase in the cost of the apparatus can be reduced.

The setting of the optimum phase adjustment amount of each phase adjusting means which varies with the reproduction speed can be dealt with by the offset correction learning algorithm, and modification of the hardware is unnecessary.

Embodiment 2

Figure 3:
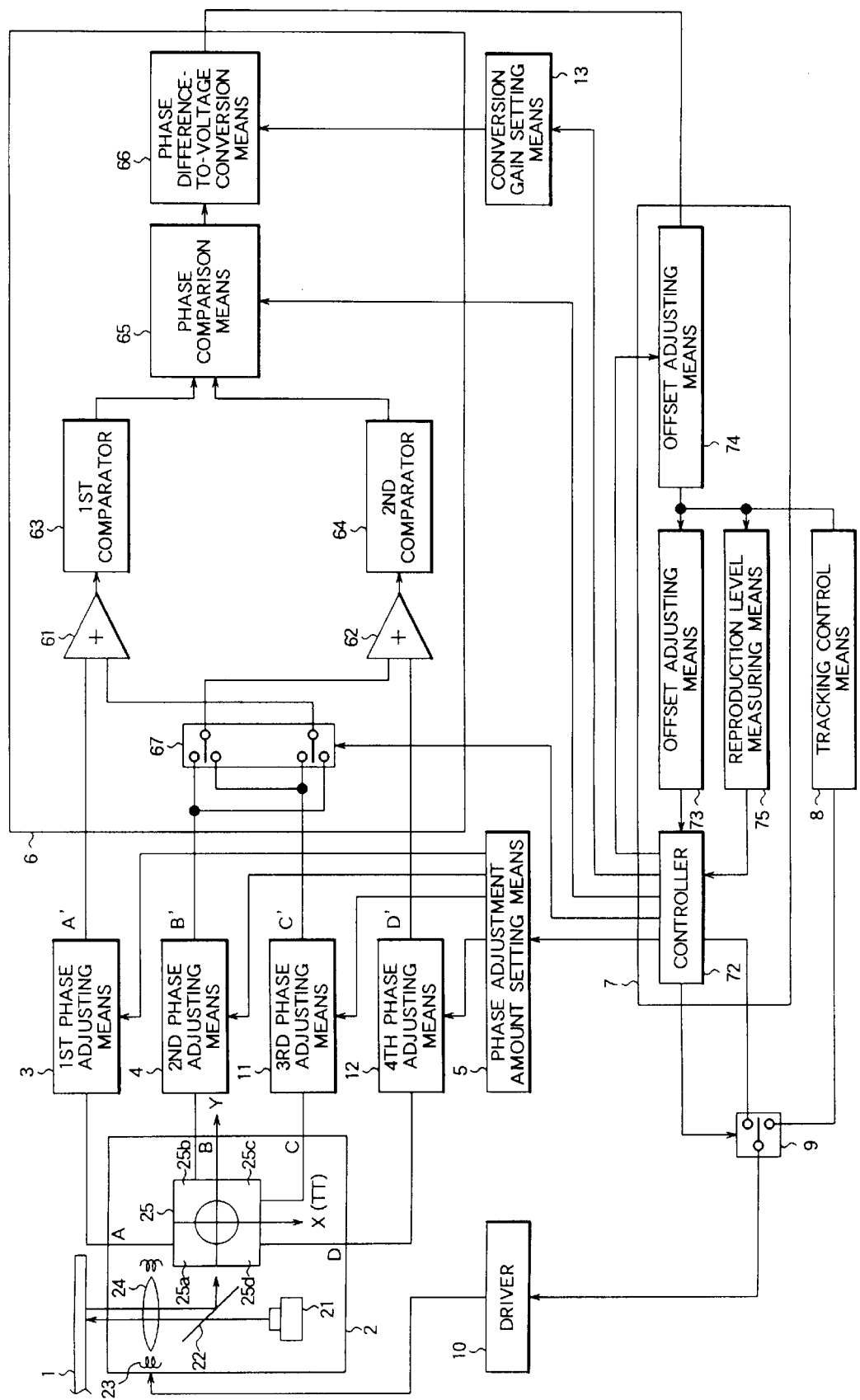
FIG. 3 is a block diagram of an optical information reproduction apparatus of Embodiment 2 of this invention.

FIG. 3 shows a block diagram illustrating an optical information reproducing apparatus of Embodiment 2 of this invention. In FIG. 3, reference numeral 1 denotes an information medium, 2 denotes an optical head, 3 denotes first phase adjusting means, 4 denotes second phase adjusting means, 5 denotes a phase adjustment amount setting means, 6 denotes a phase difference detecting means, 7 denotes a phase difference detecting means, 8 denotes a tracking control means, 9 denotes a first switch means, 10 denotes a driver, 11 denotes a third phase adjusting means, 12 denotes a second phase adjusting means, and 13 denotes a conversion gain setting means. The optical head 2 comprises an LD 21, a BS 22, an actuator 23, a lens 24, and an photo-electric conversion means 25. The phase difference detecting means 6 comprises a first adding means 61, a second adding means 62, a first comparator 63, a second comparator 64, a phase comparison means 65, a phase difference-to-voltage conversion means 66, and a second switch means 67. The offset correction learning means 7 comprises a controller 72, and an offset measuring means 73, an offset adjusting means 74, and a reproduction level measuring means 75.

Figure 4A:
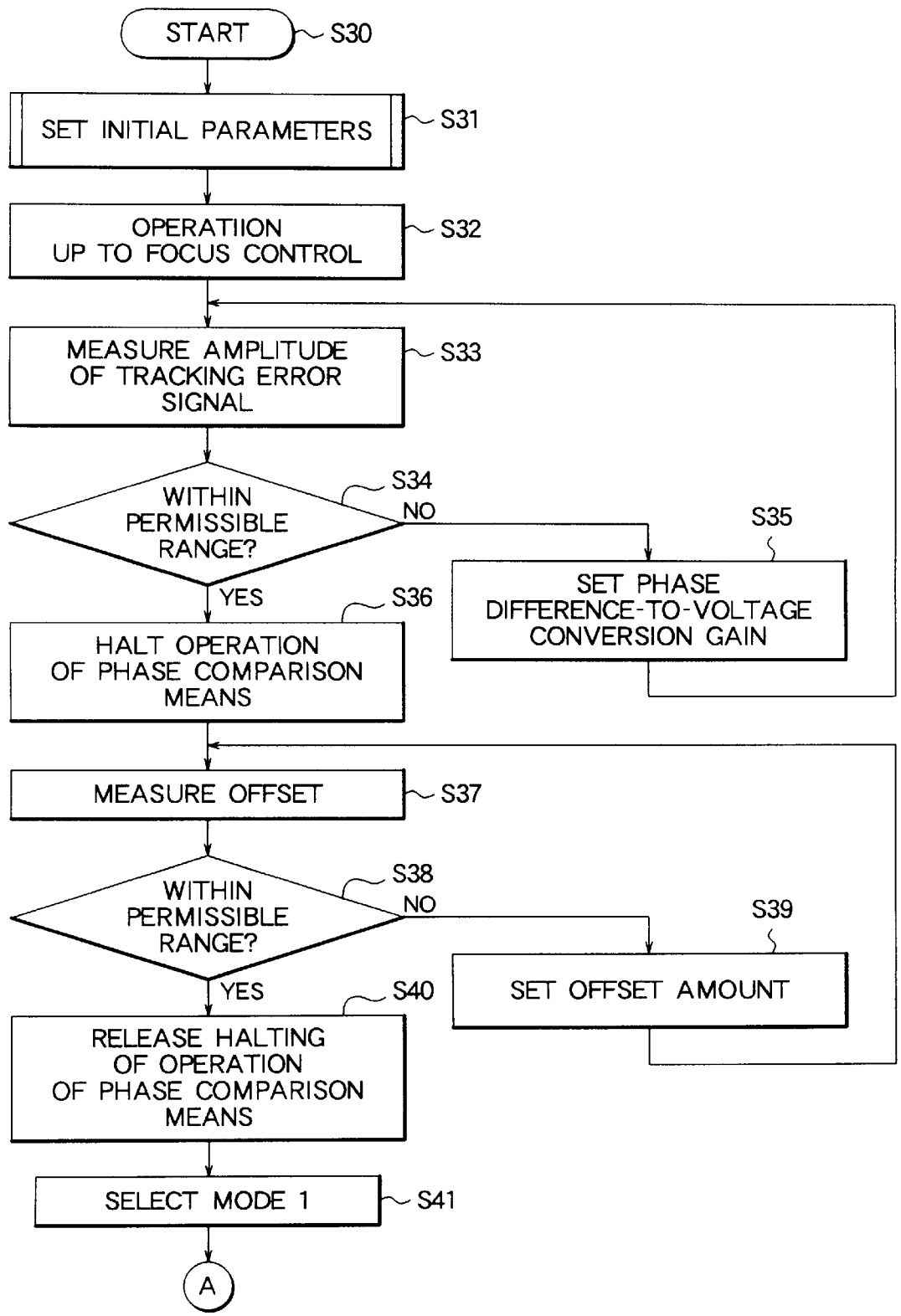
FIG. 4A, FIG. 4B and FIG. 4C are flow charts showing the offset correction learning algorithm of the offset correction learning means of the optical information reproduction apparatus of Embodiment 2.
Figure 4B:
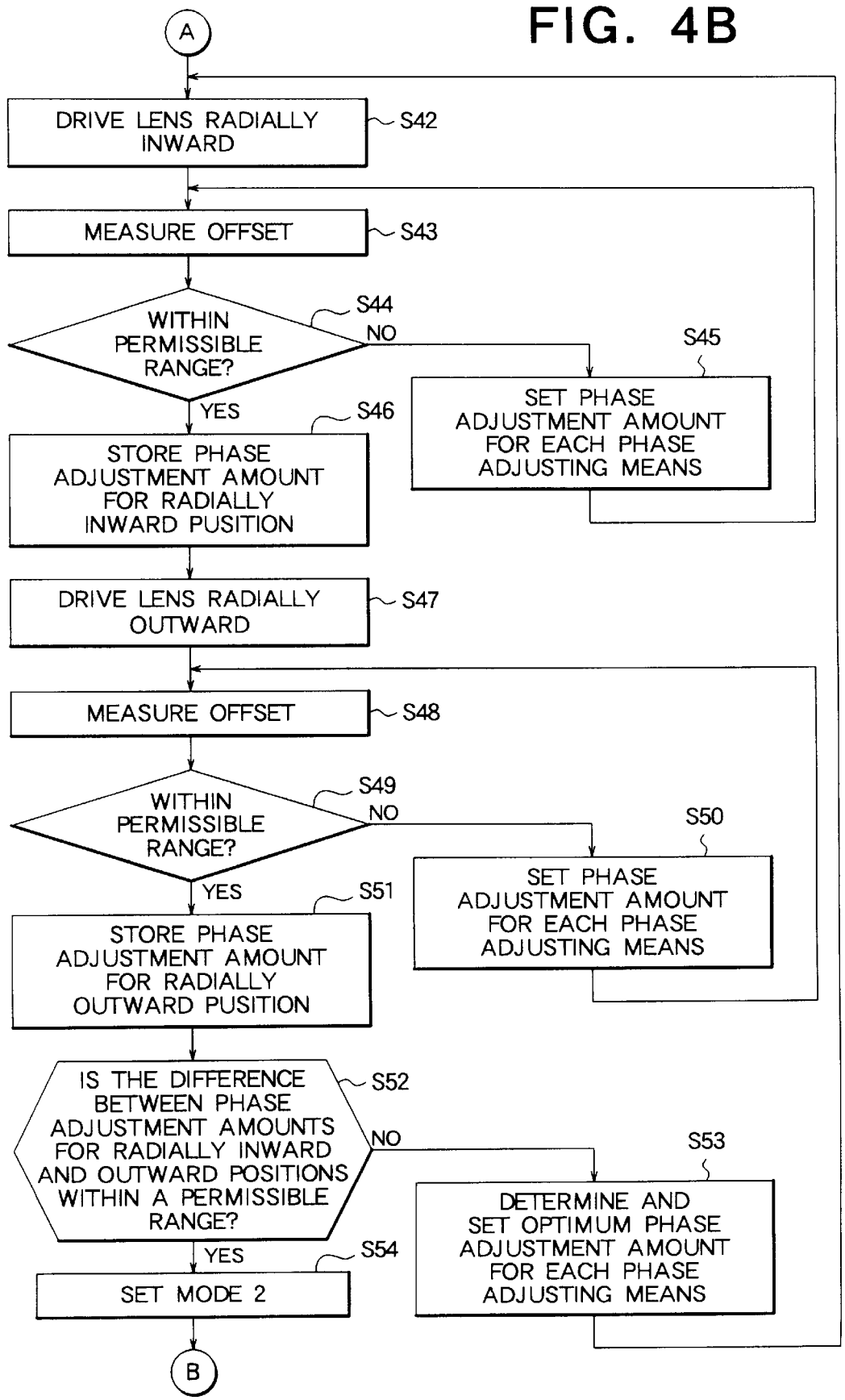
Figure 4C:
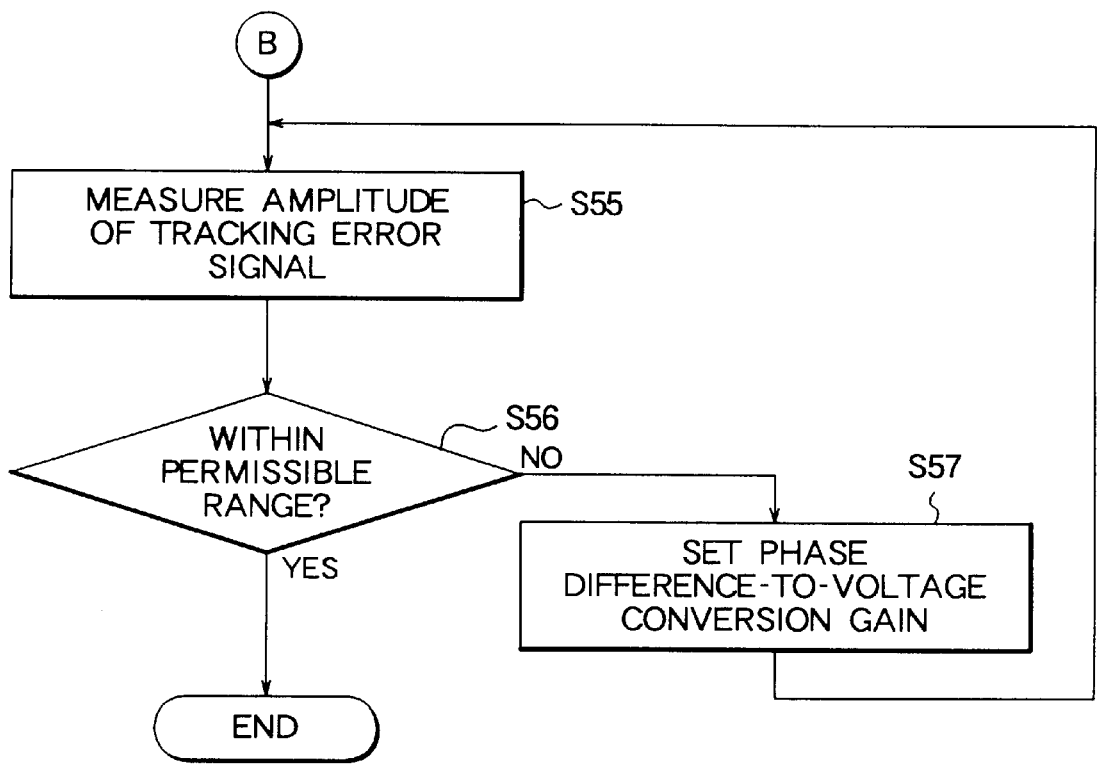
Figures 5A, 5B, 5C, 5D, 5E:
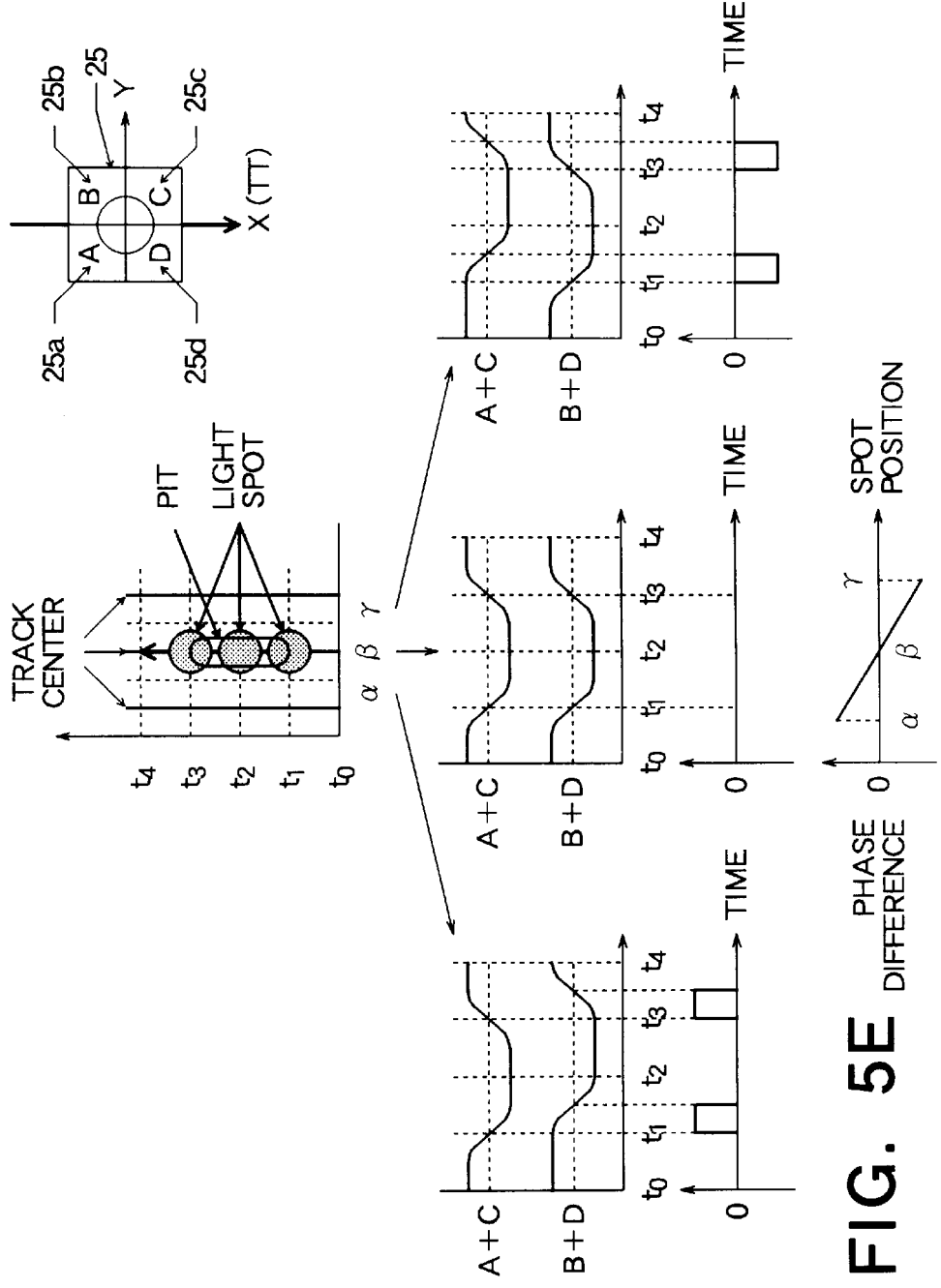
FIG. 5A to FIG. 5E are diagrams showing the principle of detection of the tracking error information in the phase difference method.
Figure 7:
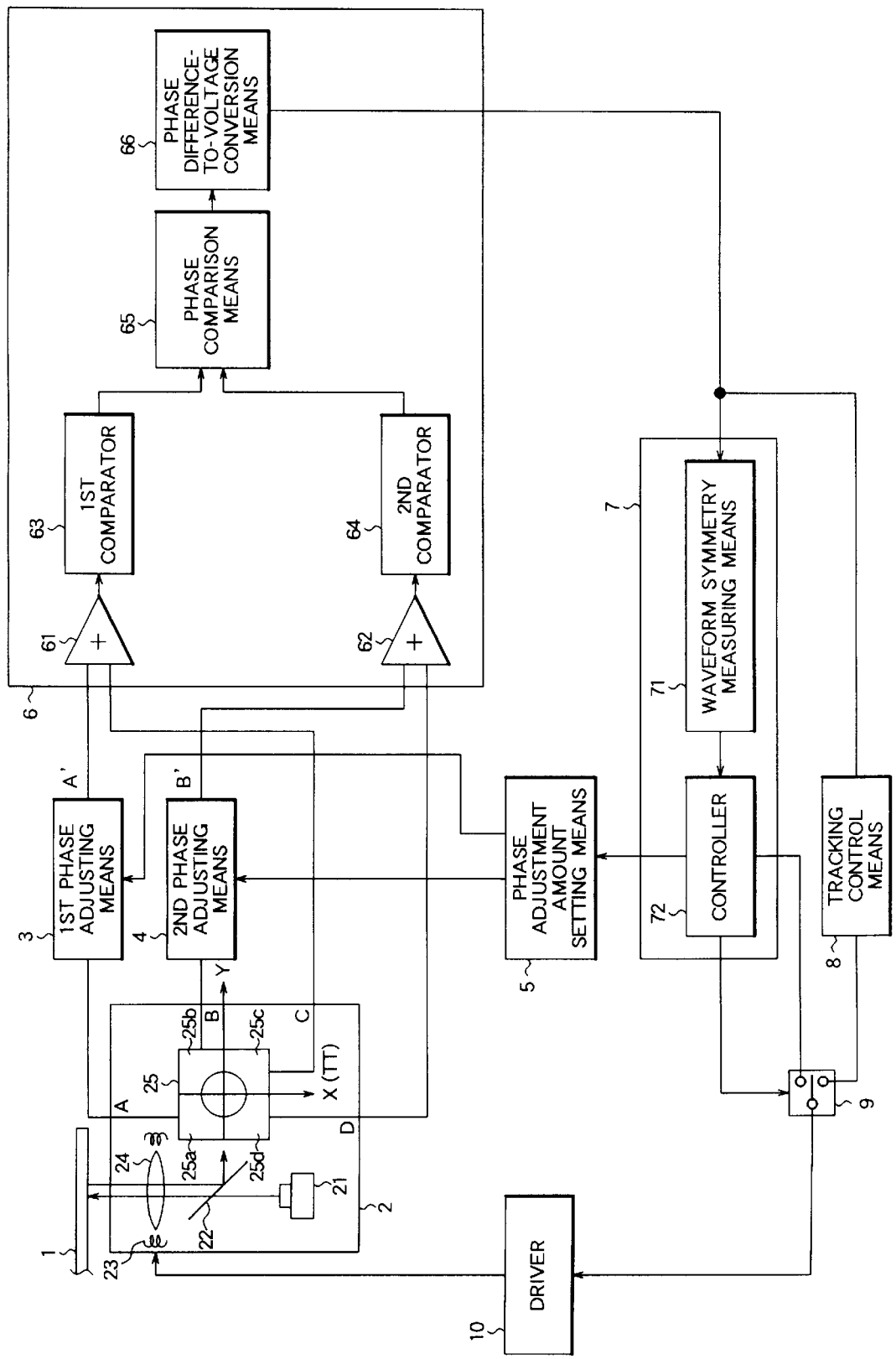
FIG. 7 is a block diagram showing a conventional optical information reproduction apparatus.
Figure 8:
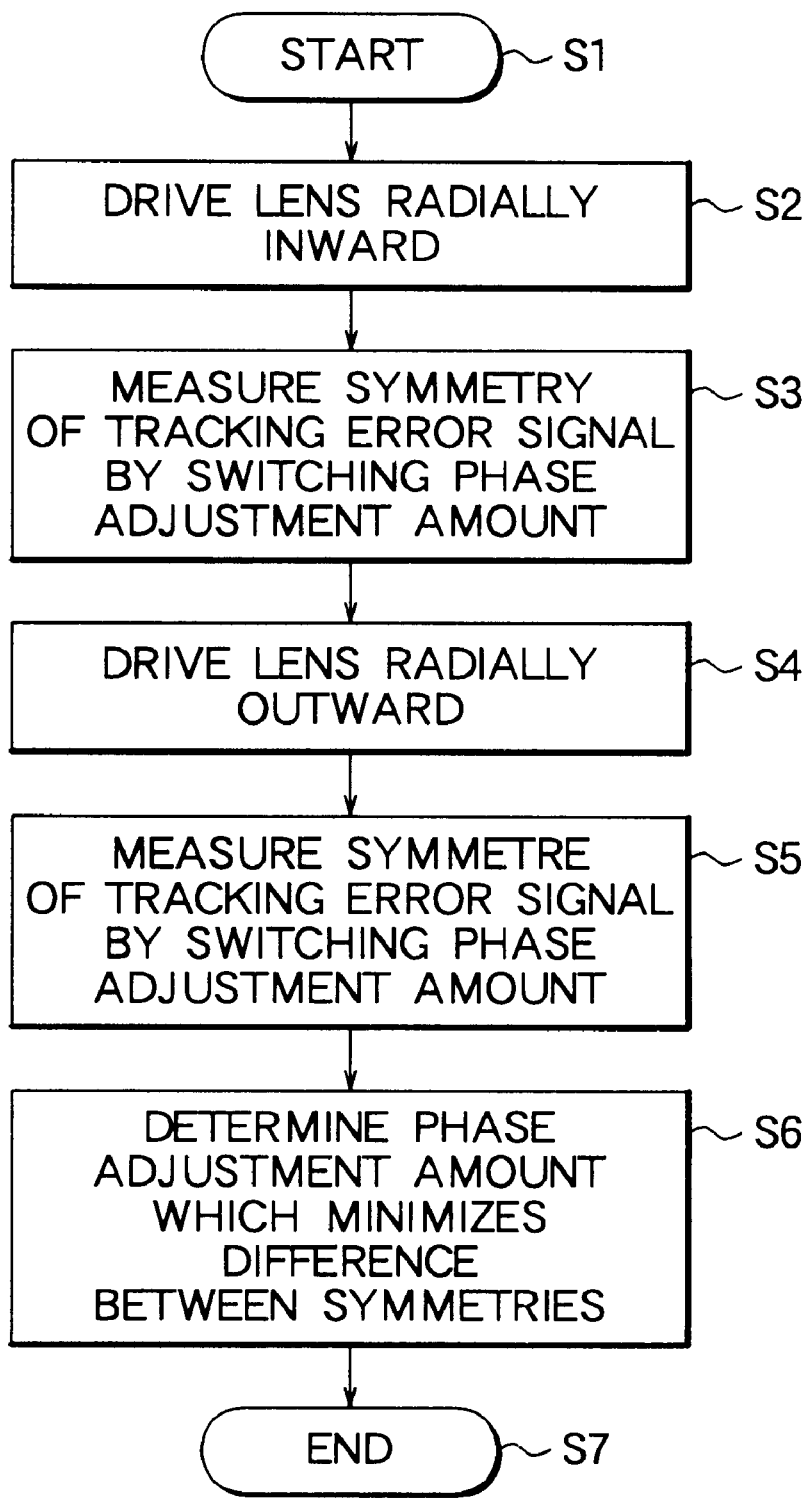
FIG. 8 is a flow chart showing the offset correction learning algorithm of the offset correction learning means of the conventional optical information reproduction apparatus.
Figure 9:
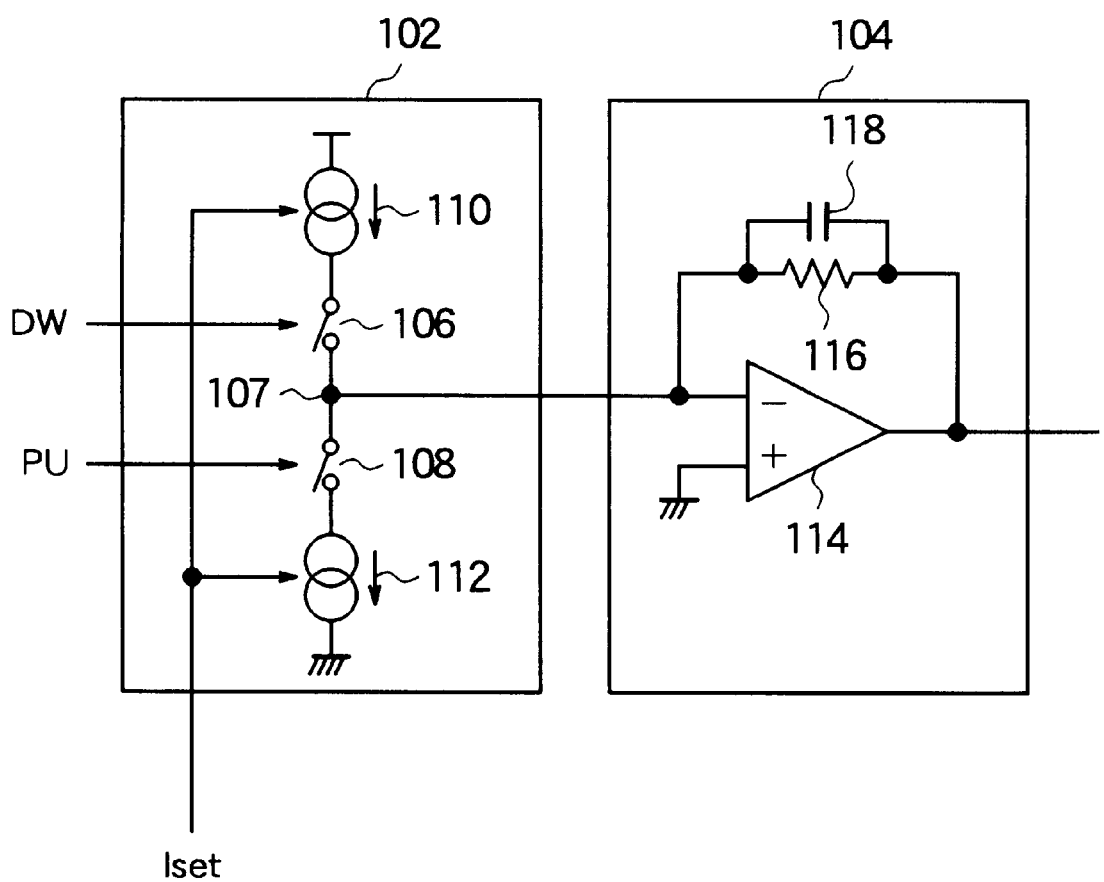
FIG. 9 is a diagram showing an example of phase difference-to-voltage conversion means.

The operation of the optical information reproducing apparatus of Embodiment 2 will next be described with reference to FIG. 3. In the figure, the reference numerals identical to those in FIG. 1 denote identical or corresponding parts. A difference in operation from the optical information reproducing apparatus of FIG. 1 is in the offset correction learning. The operation for offset correction learning will next be described along the offset correction learning algorithm shown in FIG. 4A, FIG. 4B and FIG. 4C.

When the operation in the offset correction learning mode is started (S30), a system controller, not shown, controlling the entire apparatus, sets initial parameters in the apparatus (S31), turns on the LD, and subsequently starts operation of the optical system including the focus control for converging the light spot onto the information medium (S32).

Then, the detection gain of the tracking error detection system is made substantially constant. The detection gain of the tracking error detection system tends to vary with the variations (due for example to manufacturing tolerances) of the characteristics of the optical head, the information medium, the electrical circuits and the like, with the result that the first offset and the electrical offset also vary with the detection gain. It is necessary to make the detection gain substantially constant, in order to reduce the variations of the first offset and the electrical offset and configure a reliable tracking error detection system.

This sequence is realized by making the amplitude of the tracking error signal output from the phase difference-to-voltage conversion means 66 substantially constant. Specifically, the amplitude of the output of the phase difference-to-voltage conversion means 66 is measured at the reproduction level measuring means 75 (S33), and whether or not the result of the measurement is within a permissible range is judged (S34).

If the result of the judgment is "NO," then the controller 72 changes, via the conversion gain setting means 13, the conversion gain of the phase difference-to-voltage conversion means 66 (S35), and returns to the step (S33) for detecting the level of the output of the phase difference-to-voltage conversion means 66 again. In this way, by repeating the loop formed of S33, S34, S35 and S33 until the result of the judgment becomes "YES", the amplitude of the tracking error signal output from the phase difference-to-voltage conversion means 66 is made substantially constant.

Next, the electrical offset generated in the circuit for detecting the tracking error is canceled. This is necessary to detect with a higher accuracy the first offset dependent on the lens position and the pit depth which were problematical in obtaining the tracking error signal in the phase difference method.

To cancel the electrical offset, the controller 72 halts the operation of the phase comparison means 65 (S36). In this state the offset measuring means 73 measures the output of the offset adjusting means 74, to determine the electrical offset (S37). The controller 72 then judges whether the result of the measurement is within a permissible range (S38).

If the result of the judgment is "NO," then the controller 72 adjusts the output level of the phase difference-to-voltage conversion means 66 (S39), and returns to the step (S37) for measuring the electrical offset again. By repeating the loop formed of S37, S38, S39 and S37 until the result of the judgment becomes "YES," the electrical offset dependent on the detecting circuit can be canceled.

The controller 72 then releases the halting of the operation of the phase comparison means 65 (S45), and then selects the mode 1 so that the output of the controller 72 is supplied via the first switch means 9 to the driver 10, and controls the second switch means 67 so that the output B' of the second phase adjusting means 4 is supplied to the first addition means 61 and the output C' of the third phase adjusting means 11 is supplied to the second addition means 62 (S41).

The lens 24 is thereafter driven radially inward under control by the controller 72 (S42). In this state, the output level of the phase difference-to-voltage conversion means 66 is detected by the offset measuring means 73 (S3), and the controller 72 judges whether the result is within a permissible range (S44).

If the result of the judgment is "NO," the controller 72 changes, via the phase adjustment amount setting means 5, the phase adjustment amount of each phase adjusting means individually (S45), and returns to the step (S43) for detecting the output level of the phase difference-to-voltage conversion means 66 again. By repeating the loop formed of S43, S44, S45 and S43 until the result of the judgment becomes "YES," the optimum phase adjustment amount for each phase adjusting means when the lens is radially inward is determined. The value is then stored (S46).

The controller 72 then drives the lens 24 radially outward (S47). In this state the output level of the phase difference-to-voltage conversion means 66 is detected by the offset measuring means 73 (S48), and the controller 72 judges whether the result is within a permissible range (S49).

If the result of the judgment is "NO," the controller 72 changes, via the phase adjustment amount setting means 5, the phase adjustment amount of each phase adjusting means individually (S50), and returns to the step (S48) for detecting the output level of the phase difference-to-voltage conversion means 66 again. By repeating the loop formed of S48, S49, S50 and S48 until the result of the judgment becomes "YES," the optimum phase adjustment amount for each phase adjusting means when the lens is radially outward is determined. The value is then stored (S46).

The difference between the optimum phase adjustment amount for the radially inner side, and the optimum phase adjustment amount for the radially outer side stored for each phase adjusting means is determined, and whether or not this difference is within a permissible range is judged (S52). If the result of the judgment is "NO," then the controller 72 determines the average value or the like of the optimum phase adjustment amount for the radially inner side, and the optimum phase adjustment amount for the radially outer side stored for each phase adjusting means, and sets, via the phase adjustment amount setting means 5, this value in each phase adjusting means (S53). After this setting, the controller 72 returns to S42, and the operation of S42 through S53 is repeated until the difference between the optimum phase adjustment amount for the radially inner side and the optimum phase adjustment amount for the radially outer side becomes within the permissible range.

After the phase adjustment amount of each phase adjusting means is optimized in the manner described, the operation for detecting the tracking error signal is started. The controller 72 selects the mode 2, and controls the second switch means 67 so as to exchange the input signals to the first addition means 61 and the second addition means 62, so that the output C' of the third phase adjusting means 11 is input to the one input of the first addition means 61, and the output B' of the second phase adjusting means 4 is input to the one input of the second addition means 62. As a result, the first addition means 61 outputs (A'+C'), while the second addition means 62 outputs (B'+D').

The first comparator 63 binarizes the output (A'+C') of the first addition means 61, while the second comparator 64 binarizes the output (B'+D') of the second addition means 62. The phase comparison means 65 detects the phase difference between the output of the first comparator 63 and the output of the second comparator 64. The output of the phase comparison means is time information, which is converted at a phase difference-to-voltage conversion means 66 into a voltage signal. In this way, a tracking error signal in the phase difference method is obtained.

Lastly, a fine adjustment is made so that the amplitude of the tracking error signal output from the phase difference-to-voltage conversion means 66 is at a predetermined level. The output amplitude from the phase difference-to-voltage conversion means 66 is measured at the reproduction level measuring means 75 (S55), and whether or not the result is within a permissible range is judged (S56). If the result is "NO," then the controller 72 changes, via the conversion gain setting means 13, the conversion gain of the phase difference-to-voltage conversion means 66 (S57), and returns to the step (S55) for detecting the output level of the phase difference-to-voltage conversion means 66 again.

In this way, by repeating the loop formed of S55, S56, S57 and S55 until the result of the judgment becomes "YES," the amplitude of the tracking error signal output from the phase difference-to-voltage conversion means 66 is made substantially constant. When the result of the judgment becomes "YES," the operation in the offset correction learning mode is terminated (S58).

The tracking error signal after the termination of the operation in the offset correction learning mode described above represents the difference between the target position of the light spot and the current position, i.e., the error amount, and the tracking control means 8 controls the position of the light spot to eliminate this error amount. The control over the light spot position is accomplished by control over the radial position of the lens 24 by means of the driver 10 which drives the actuator 23 in accordance with the output of the tracking control means 8. To this end, the controller 72 causes the output of the tracking control means 8 to be supplied via the first switch means 9 to the driver 10.

Also in FIG. 3, as in Embodiment 1, the second switching means 67 is disposed between the second and third phase adjusting means and the first and second addition means, but this should not be taken as a limitation. What is required is that the phase difference between (A'+B') and (C'+D'), or (A'+C') and (B'+D') be determined at the phase comparison means 65.

The phase difference-to-voltage conversion means 66 may be of any configuration as long as it can converts the time information, which is a phase difference, to a voltage signal, and whose conversion gain can be varied. In general it is possible to configure it with a charge pump of a variable drive current, and an LPF. In this case, there is an advantage that the drive current can be controlled by a DAC or the like. As another configuration, the LPF may be formed of an active filter, whose gain is variable.

Details of an example of a phase difference-to-voltage conversion means 66 are described with reference to FIG. 9 to FIG. 12D. The illustrated phase difference-to-voltage conversion means 66 comprises a charge pump 102 and an LPF 104.

The charge pump 102 comprises first and second switching elements 106 and 108 having first ends connected with each other, at a node 107. A second end of the first switching element 106 is connected to a first constant-current source 110. A second end of the second switching element 108 is connected to a second constant-current source 112. The first and second switching elements 106 and 108 are controlled by a first and second outputs DW and PU of the phase comparison means 65. That is, when the first output DW of the phase comparison means 65 is active, the first switching element 106 is closed or conductive. When the second output PU of the phase comparison means 65 is active, the second switching element 108 is closed or conductive.

The LPF 104 comprises an operational amplifier 114 with a resistor 116 and a capacitor 118 connected across the input and output terminals of the operation amplifier 114. The input terminal of the operational amplifier 114 is connected to the node 107. The output terminal of the operational amplifier 114 forms the output terminal of the phase difference-to-voltage conversion means 66.

The outputs PU and DW of the phase comparison means 65 are dependent on the outputs of the first and second comparators 63 and 64.

Figure 10A:
FIG. 10A to FIG. 10D, FIG. 11A to FIG. 11D, and FIG. 12A to FIG. 12D are time charts showing the operation of the phase comparison means and the phase difference-to-voltage conversion means.
Figure 10B:
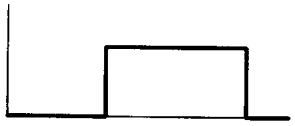
Figure 10C:
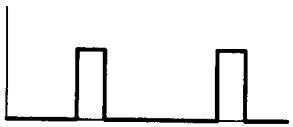
Figure 10D:

When the output of the first and second comparators 63 and 64 are as shown in FIG. 10A and FIG. 10B, that is, the output of the first comparator 63 is leading in phase the output of the second comparator 64, the output PU becomes active when one of the outputs of the comparators 63 and 64 is active and the other is inactive, as shown in FIG. 10C. The other output DW is kept inactive, as shown in FIG. 10D. The switching element 108 is conductive when the output PU is active, and a current flows from the capacitor 118 of the LPF 104 through the second switching element 104, and through the constant-current source 112, so that the capacitor 118 is discharged. The output of the LPF 104 is thereby increased. The switching element 106 is kept nonconductive.

Figure 11A:
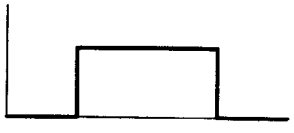
Figure 11B:
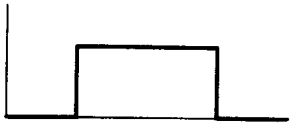
Figure 11C:
Figure 11D:

When the outputs of the first and second comparators 63 and 64 are as shown in FIG. 11A and FIG. 11B, that is, when they are in phase, the outputs PU and DW of the phase comparison means 65 are kept inactive, or low as shown in FIG. 11C and FIG. 11D. The switching elements 106 and 108 are kept nonconductive, and the charge on the capacitor 118 is maintained, so that the output of the LPF is maintained.

Figure 12A:
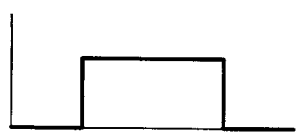
Figure 12B:
Figure 12C:
Figure 12D:
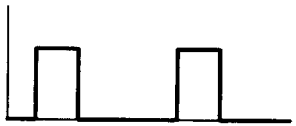

When the output of the first and second comparators 63 and 64 are as shown in FIG. 12A and FIG. 12B, that is, the output of the first comparator 63 is lagging behind the output of the second comparator 64, the output DW becomes active when one of the outputs of the comparators 63 and 64 is active and the other output is inactive. The other output PU is kept inactive. The switching element 106 is conductive when the output DW is active, and a current flows the first constant current source 110, and the first switching element 106, to the capacitor 118, so that the capacitor is charged. As a result, the output of the LPF 104 is decreased. The switching element 108 is kept nonconductive.

Thus, the output of the LPF 104 is increased or decreased according to the output of the phase comparison means, i.e., according to the relative phase between the outputs of the first and second comparators 63 and 64.

The conversion gain can be adjusted by varying the current values of the current sources 110 and 112, by means of a control signal Iset, supplied from the conversion gain setting means 13.

In the optical information reproducing method and apparatus configured as described above, the detection circuit is free from electrical offset, and by correcting the gain of the entire tracking error detection system to a predetermined value, the amplitude of the tracking error signal can be adjusted to a predetermined level. In addition, the first offset dependent on the pit depth and the lens position, which was problematical in obtaining the tracking error signal in the phase difference method can be detected directly, and the phase adjustment amount for each phase adjusting means can be optimized in accordance with this information, through repeated learning control. Accordingly, a tracking error detection system which is free from offset and which has a constant detection gain can be realized, and the tracking control system becomes more stable, and the reliability of the apparatus is improved.

Moreover, the setting of the optimum phase adjustment amount for each phase adjusting means which varies with the reproduction speed can be dealt with by the above-described offset correction learning algorithm, and the hardware need not be altered, as in Embodiment 1.

Because the invention has been configured as described above, it has the following advantages.

Just by adding a simple member for switching the signals to be compared at the phase comparison means, to the conventional optical reproducing apparatus, it is possible to directly detect as a voltage the phase difference signal information between the two signals from the optical detectors situated in respective quadrants of an imaginary X-Y coordinates, whose origin is disposed on the optical axis of the optical system and whose X-axis effectively extends in the track tangential direction and whose Y-axis effectively extends transversely to the track tangential direction, and the phase adjustment amount for each phase adjusting means can be optimized through repeated learning control in accordance with this information. As a result, a tracking error signal detection system which is free from offset can be realized, and the reliability of the apparatus can be improved.

Moreover, by switching the signals to be compared by the phase comparison means in accordance with the output of the offset correction learning means, the control over the reproduction of the tracking error signal and the offset correction can be made without fail.

Moreover, the optical information reproducing method and apparatus according to Embodiment 2 of the invention can cancel the electrical offset by a means for correcting the electrical offset generated in the tracking error signal detection circuit, and can make constant the amplitude of the tracking error signal by a means for correcting the gain of the entire tracking error detection system. As a result, the tracking control system is more stable, and the reliability of the apparatus is further improved.

Moreover, because the phase difference-to-voltage conversion means is formed of a charge pump and an LPF, and the conversion gain setting means is formed to change the drive current of the charge pump, control of the drive current by means of a DAC which is suitable for implementation as an LSI is possible.

Furthermore, if, in a configuration in which the conversion gain setting means is formed of a means for setting the gain of the LPF, the LPF is formed of an active filter suitable for implementation as an LSI, the control by a controller is facilitated. By implementation as an LSI, variations (due for example to manufacturing tolerances) of the element used for setting the gain are reduced, and the gain setting accuracy is improved, and the quality of the tracking error signal is improved. The gain setting of the conversion gain setting means can be controlled via a controller, by addition of a software, which does not affect the development cost, rather than a hardware, there is an advantage in terms of cost of the apparatus.

Moreover, the offset is not determined from the symmetry of the waveform of the tracking error signal as in the prior art, but the offset itself can be measured. It is therefore unnecessary to use an ADC of an expensive, high-speed type, and yet the detection accuracy is not impaired.

Furthermore, by canceling the electrical offset generated in the circuits, it is possible to configure a more reliable tracking error detection system.

Furthermore, by adjusting the phase difference-to-voltage conversion gain, the amplitude of the tracking error signal can be finely controlled.

The method and apparatus of the present invention is applicable to a situation where the first offset due to deviation of the pit depth from a predetermined value ($\lambda/4$) is canceled, and also to a situation where the first offset due to deviation of the phase difference between the pit parts and other parts from the predetermined value ($\lambda/4$) is canceled.

What is claimed:

1. An optical information reproducing apparatus for reading recorded information by having a light spot trace an information track having a sequence of information pits by which information is recorded on an information medium, comprising:

a light source emitting a light beam;

a photo-electric converter including first, second, third, and fourth optical detectors;

an optical system passing the light beam from the light source to the photoelectric converter via the information medium;

said first, second, third, and fourth optical detectors converting the light beam into electrical signals, said first, second, third, and fourth optical detectors being situated in a far-field of the information pits in separate quadrants of an imaginary X-Y coordinate system, whose origin is disposed on an optical axis of the optical system and whose X-axis effectively extends in the track tangential direction and whose Y-axis effectively extends transversely to the track tangential direction, said first and second optical detectors being disposed on one side of the Y-axis, said third optical detector being disposed on the other side of the Y-axis, and disposed diagonally with respect to the first optical detector, and said fourth optical detectors being disposed on the other side of the Y-axis, and disposed diagonally with respect to the second optical detector;

first, second, third, and fourth phase adjusters respectively adjusting the phase of each of the outputs from the first, second, third, and fourth optical detectors;

a phase difference detector selectively detecting the phase difference between a first sum signal obtained by adding the output of the first phase adjuster and the output of the second phase adjuster, and a second sum signal obtained by adding the output of the third phase adjuster and the output of the fourth phase adjuster, and the phase difference between a third sum signal obtained by adding the output of the first phase adjuster and the output of the third phase adjuster, and a fourth sum signal obtained by adding the output of the second phase adjuster and the output of the fourth phase adjuster;

an offset correction learning unit adjusting the first, second, third, and to fourth phase adjusters in accordance with the output of the phase difference between the first and the second sum signals from the phase difference detector, so as to eliminate the phase difference; and a tracking controller obtaining the tracking error signal information from the output of the phase difference between the third and fourth sum signals from the phase difference detector.

2. The optical information reproducing apparatus as set forth in claim 1, wherein said phase difference detector comprises:

a switch switching between the phase difference between the first and second sum signals, and the phase difference between the third and fourth sum signals, in accordance with the output from the offset correction learning unit.

3. The optical information reproducing apparatus as set forth in claim 1, wherein said offset correction learning unit comprises:

an offset adjuster adjusting the electrical offset superimposed with the output of the phase difference detector;

an offset measuring unit measuring the output from the offset adjuster, to determine the electrical offset;

a reproduction level measuring unit measuring the output amplitude of the offset adjuster; and a controller responsive to the output from the offset measuring unit and the output from the reproduction level measuring unit, for controlling the phase difference detector, the offset adjuster, and the phase adjuster.

4. The optical information reproducing apparatus as set forth in claim 1, wherein said phase difference detector detects, by a phase comparison, the phase difference between the signals, and converts, by a low pass filter, the phase difference into a voltage, with the gain for conversion to the voltage being varied by variation of the gain of the low-pass filter.

5. The optical information reproducing apparatus as set forth in claim 1, wherein said phase difference detector detects, by phase comparison, the phase difference between the two signals, and converts, by a charge pump and a low-pass filter, the phase difference into a voltage, with the gain for conversion to the voltage being varied by variation of the drive current to the charge pump or the gain of the low-pass filter.

6. An optical information reproducing method for reading recorded information by having a light spot trace an information track having a sequence of information pits by which information is recorded on an information medium, said method being implemented with an optical information reproducing apparatus that comprises:
a light source emitting a light beam;
a photo-electric converter including first, second, third, and fourth optical detectors;
an optical system passing the light beam from the light source to the photo-electric converter via the information medium;
said first, second, third, and fourth optical detectors converting the light beam into electrical signals,
said first, second, third, and fourth optical detectors being situated in a far-field of the information pits in separate quadrants of an imaginary X-Y coordinate system, whose origin is disposed on an optical axis of the optical system and whose X-axis effectively extends in the track tangential direction and whose Y-axis effectively extends transversely to the track tangential direction,
said first and second optical detectors being disposed on one side of the Y-axis,
said third optical detector being disposed on the other side of the Y-axis, and disposed diagonally with respect to the first optical detector, and
said fourth optical detector being disposed on the other side of the Y-axis, and disposed diagonally with respect to the second optical detector;

said method comprising:
(a) conducting an initial setting when an offset correction learning mode is started;
(b) selecting a first phase comparison mode in which a phase difference between a first sum signal obtained by adding a first phase adjustment output and a second phase adjustment output, and a second sum signal obtained by adding a third phase adjustment output and a fourth phase adjustment output, said first, second, third, and fourth phase adjustment outputs being obtained by individually adjusting the phase of the output of each of the first, second, third, and fourth optical detectors;
(c) driving lens of said optical system in a first one of the radially inward and radially outward directions of the information medium;
(d) detecting the phase difference in the operation in the first phase comparison mode, in a state in which the lens has been driven to said first one of the radially inward and radially outward directions of the information medium;
(e) individually adjusting the phase of the output of each of the first, second, third, and fourth optical detectors so as to eliminate the phase difference detected at (d);
(f) driving the lens in a second one of the radially inward and radially outward directions of the information medium;
(g) detecting the phase difference in the operation in the first phase comparison mode, in a state in which the lens has been driven to said second one of the radially inward and radially outward directions of the information medium;
(h) individually adjusting the phase of the output of each of the first, second, third, and fourth optical detectors so as to eliminate the phase difference detected at (g); and
(i) adjusting the adjustment amount at (e) and (h).

7. The optical information reproducing method as set forth in claim 6, further comprising:
selecting a second phase comparison mode for detecting the phase difference between a third sum signal obtained by adding the first phase adjustment output and the third phase adjustment output, and a fourth sum signal obtained by adding the second phase adjustment output and the fourth phase adjustment output;
making an adjustment so that the reproduction level of the phase difference output detected in the second phase comparison mode is within a permissible range; and
making an adjustment so that the electrical offset superimposed on the phase difference output is within a permissible range.

8. The optical information reproducing method as set forth in claim 6, further comprising:
selecting a second phase comparison mode for detecting the phase difference between a third sum signal obtained by adding the first phase adjustment output and the third phase adjustment output, and a fourth sum signal obtained by adding the second phase adjustment output and the fourth phase adjustment output;
said step of selecting the second phase comparison mode being conducted after (e) and (g); and
adjusting the amplitude of the tracking error signal.

9. An offset removing circuit for an optical information reproducing apparatus for reading recorded information by having a light spot trace an information track having a sequence of information pits by which information is recorded on an information medium, the optical information reproducing apparatus comprising:
a light source emitting a light beam;
a photo-electric converter including first, second, third, and fourth optical detectors;
an optical system passing the light beam from the light source to the photoelectric converter via the information medium;
said first, second, third, and fourth optical detectors converting the light beam into electrical signals,
a said first, second, third, and fourth optical detectors being situated in a far-field of the information pits in separate quadrants of an imaginary X-Y coordinate system, whose origin is disposed on the optical axis of the optical system and whose X-axis effectively extends in the track direction and whose Y-axis effectively extends transversely to the track direction,
said first and second optical detectors being disposed on one side of the Y-axis,
said third optical detector being disposed on the other side of the Y-axis, and disposed diagonally with respect to the first optical detector, and
said fourth optical detector being disposed on the other side of the Y-axis, and disposed diagonally with respect to the second optical detector;

said offset removing circuit comprising:
first, second, third, and fourth phase adjusters respectively adjusting the phase of the output of the first, second, third, and fourth optical detectors;
a phase difference detector selectively detecting the phase difference between a first sum signal obtained by adding the output of the first phase adjuster and the output of the second phase adjuster, and a second sum signal obtained by adding the output of the third phase adjuster and the output of the fourth phase adjuster, and the phase difference between a third sum signal obtained by adding the output of the first phase adjuster and the output of the third phase adjuster, and a fourth sum signal obtained by adding the output of the second phase adjuster and the output of the fourth phase adjuster; and a phase adjustment amount setting unit setting the phase adjustment amount of the first, second, third, and fourth phase adjusters so that the phase difference between the first sum signal and the second sum signal is made zero.

10. The offset removing circuit as set forth in claim 9, further comprising:

an offset adjuster adjusting the electrical offset amount of an electrical circuit forming the optical information reproducing apparatus when the operation of the phase difference detector is halted.

11. An optical information reproducing apparatus that reads information from a medium on which information pits are provided in a plurality of tracks, comprising:

an optical head, said optical head including:
  a light source emitting a light beam;
  an optical system directing the light beam emitted from said light source onto the medium; and
  a photo-electric converter having first, second, third, and fourth optical detectors that receive light of said light beam emitted by said light source via the medium and said optical system and convert received light to an electrical output,
    said first, second, third, and fourth optical detectors being situated in a far-field of the information pits of the medium in separate quadrants of a coordinate system, the coordinate system being defined by an origin disposed on the optical axis of said optical system, an X-axis effectively extending in a track direction of the medium, and a Y-axis effectively extending transversely to the track direction,
    said first and second optical detectors being disposed on one side of the Y-axis, said third optical detector being disposed on the other side of the Y-axis, diagonal to the first optical detector, and said fourth optical detector being disposed on the other side of the Y-axis, diagonal with respect to the second optical detector;

a phase adjusting arrangement adjusting the phase of each of the electrical outputs of said first, second, third, and fourth optical detectors; and a phase difference detector selectively detecting the phase difference between a first sum signal obtained by adding a signal corresponding to the electrical output of said first optical detector and a signal representing the electrical output of said second optical detector, and a second sum signal obtained by adding a signal representing the electrical output of said third optical detector and a signal representing the electrical output of said fourth optical detector, and the phase difference between a third sum signal obtained by adding the signal corresponding to the output of said first optical detector and the signal corresponding to the electrical output of said third optical detector, and a fourth sum signal obtained by adding the signal corresponding to the electrical output of said second optical detector and the electrical signal corresponding to the electrical output of said fourth optical detector; wherein said phase adjusting arrangement adjusts each of the electrical outputs of said first, second, third, and fourth optical detectors so that the phase difference between the first sum signal and the second sum signal is approximately zero.

12. The optical information reproducing apparatus as set forth in claim 11, further comprising:

a tracking controller obtaining tracking error information from the output of the phase difference between the third and fourth sum signals output by said phase difference detector.

13. The optical information reproducing apparatus as set forth in claim 11, wherein said phase difference detector comprises:

a switch switching between the phase difference between the first and second sum signals, and the phase difference between the third and fourth sum signals.

14. The optical information reproducing apparatus as set forth in claim 11, wherein the amount of phase adjustment performed by said phase adjusting arrangement is calculated by an offset correction learning unit that includes:

an offset adjuster adjusting an electrical offset superimposed with the output of said phase difference detector;

an offset measuring unit measuring the output from said offset adjuster to determine the electrical offset;

a reproduction level measuring unit measuring the output amplitude of said offset adjuster; and a controller responsive to the output from said offset measuring unit and the output from the reproduction level measuring unit, for controlling said phase difference detector, the offset adjuster, and the phase adjusting arrangement.

15. The optical information reproducing apparatus as set forth in claim 11, wherein said phase difference detector detects phase difference and converts, by a low pass filter, the phase difference into a voltage, with the gain for conversion to the voltage being varied by variation of the gain of the low-pass filter.

16. The optical information reproducing apparatus as set forth in claim 11, wherein said phase difference detector converts the detected phase difference into a voltage using a charge pump and a low-pass filter, the gain for conversion to the voltage being varied by variation of the drive current to the charge pump or the gain of the low-pass filter.

17. An optical information reproducing method for reading recorded information from a medium on which information pits are provided in a plurality of tracks, said method being implemented with an optical information reproducing apparatus that comprises an optical head that includes:
  a light source emitting a light beam;
  an optical system directing the light beam emitted from said light source onto the medium; and
  a photo-electric converter having first, second, third, and fourth optical detectors that receive light of said light beam emitted by said light source via the medium and said optical system and convert received light to an electrical output,
    said first, second, third, and fourth optical detectors being situated in a far-field of the information pits of the medium in separate quadrants of a coordinate system, the coordinate system being defined by an origin disposed on the optical axis of said optical, an X-axis effectively extending in a track direction of the medium, and a Y-axis effectively extending transversely to the track direction,
    said first and second optical detectors being disposed on one side of the Y-axis, said third optical detector being disposed on the other side of the Y-axis, diagonal to the first optical detector, and said fourth optical detector being disposed on the other side of the Y-axis, diagonal with respect to the second optical detector;

said method comprising:
- (a) conducting an initial setting when an offset correction learning mode is started;
- (b) selecting a first phase comparison mode in which a phase difference between a first sum signal obtained by adding a first detector signal corresponding to the electrical output of said first optical detector and a second detector signal corresponding to the electrical output of said second optical detector, and a second sum signal obtained by adding a third detector signal corresponding to the electrical output of said third optical detector and a fourth detector signal corresponding to the electrical output of said fourth optical detector, wherein each of said first, second, third, and fourth detector signals is a phase adjusted electrical output of said first, second, third, and fourth optical detectors;
- (c) driving a lens of said optical system in a first one of the radially inward and radially outward directions of the information medium;
- (d) detecting the phase difference in the operation in the first phase comparison mode, in a state in which the lens has been driven to said first one of the radially inward and radially outward directions of the information medium;
- (e) individually adjusting the phase of the electrical output of each of said first, second, third, and fourth optical detectors so as to eliminate the phase difference detected at (d);
- (f) driving the lens in a second one of the radially inward and radially outward directions of the information medium;
- (g) detecting the phase difference in the operation in the first phase comparison mode, in a state in which the lens has been driven to said second one of the radially inward and radially outward directions of the information medium;
- (h) individually adjusting the phase of the electrical output of each of said first, second, third, and fourth optical detectors so as to eliminate the phase difference detected at (g); and
- (i) adjusting the adjustment amount at (e) and (h).

18. The optical information reproducing method as set forth in claim 17, further comprising:

selecting a second phase comparison mode for detecting the phase difference between a third sum signal obtained by adding the first detector signal and the third detector signal, and a fourth sum signal obtained by adding the second detector signal and the fourth detector signal;

making an adjustment so that the reproduction level of the phase difference output detected in the second phase comparison mode is within a permissible range; and making an adjustment so that an electrical offset superimposed on the phase difference output is within a permissible range.

19. The optical information reproducing method as set forth in claim 17, further comprising:

selecting a second phase comparison mode for detecting the phase difference between a third sum signal obtained by adding the first detector signal and the third detector signal, and a fourth sum signal obtained by adding the second detector signal and the fourth detector signal;

said step of selecting the second phase comparison mode being conducted after (e) and (g); and adjusting the amplitude of a tracking error signal.

* * * * *